United States Patent
Yamasaki et al.

(10) Patent No.: US 12,145,222 B2
(45) Date of Patent: *Nov. 19, 2024

(54) STEEL-FRAME CUTTING METHOD AND DEVICE

(71) Applicant: KOBELCO CONSTRUCTION MACHINERY CO., LTD., Hiroshima (JP)

(72) Inventors: Takanori Yamasaki, Hiroshima (JP); Koichi Yamashita, Hiroshima (JP); Yoshinobu Hosaka, Hiroshima (JP); Tsuguhito Fujita, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 952 days.

This patent is subject to a terminal disclaimer.

(21) Appl. No.: 17/056,222

(22) PCT Filed: Apr. 15, 2019

(86) PCT No.: PCT/JP2019/016179
§ 371 (c)(1),
(2) Date: Nov. 17, 2020

(87) PCT Pub. No.: WO2019/230223
PCT Pub. Date: Dec. 5, 2019

(65) Prior Publication Data
US 2021/0213552 A1 Jul. 15, 2021

(30) Foreign Application Priority Data
May 31, 2018 (JP) .................................. 2018-104633

(51) Int. Cl.
*B23K 7/00* (2006.01)
*B23K 7/10* (2006.01)
(Continued)

(52) U.S. Cl.
CPC ................ *B23K 7/003* (2013.01); *B23K 7/10* (2013.01); *B23K 37/0435* (2013.01); *B23K 2101/24* (2018.08); *B23K 2103/04* (2018.08)

(58) Field of Classification Search
CPC ........ B23K 7/003; B23K 7/10; B23K 7/0435; B23K 2101/24; B23K 2103/04
See application file for complete search history.

(56) References Cited

U.S. PATENT DOCUMENTS 11,712,763 B2 * 8/2023 Hosaka .................. B23K 7/105
219/121.39
2021/0213552 A1 * 7/2021 Yamasaki .......... B23K 37/0294

FOREIGN PATENT DOCUMENTS

CN 101698263 A 4/2010
CN 103658463 A 3/2014
(Continued)

OTHER PUBLICATIONS

International Search Report issued on Jun. 25, 2019 in PCT/JP2019/016179 filed on Apr. 15, 2019, 2 pages.
(Continued)

*Primary Examiner* — Keith D. Hendricks
*Assistant Examiner* — Moriah S. Smoot
(74) *Attorney, Agent, or Firm* — Oblon, McClelland, Maier & Neustadt, L.L.P.

(57) ABSTRACT

A method and an apparatus efficiently and reliably cut a steel frame. The cutting method includes locating a cutting torch apart from the steel frame held by a holding device in a direction along a cutting surface, moving the cutting torch from a cutting start position to a first cutting end position in a first feed direction perpendicular to a supply direction along the cutting surface, while applying a flame from a fire port of the cutting torch in the supply direction and supplying cutting oxygen to thereby cut a part of the cutting surface, stopping the cutting torch at the first cutting end
(Continued)

position and thereafter cutting an uncut part by moving the cutting torch from the first cutting end position in a second feed direction opposite to the first feed direction.

10 Claims, 21 Drawing Sheets

(51) Int. Cl.
*B23K 37/04* (2006.01)
*B23K 101/24* (2006.01)
*B23K 103/04* (2006.01)

(56) References Cited

FOREIGN PATENT DOCUMENTS

| CN | 104668716 A | 6/2015 |
|---|---|---|
| EP | 3 584 391 A1 | 12/2019 |
| JP | 51-137650 | 11/1976 |
| JP | 57-146473 A | 9/1982 |
| JP | 62-196853 U | 12/1987 |
| JP | 2005-2688 A | 1/2005 |
| JP | 2007-146571 A | 6/2007 |
| JP | 2012-172363 A | 9/2012 |
| JP | 2015227535 A * | 12/2015 |

OTHER PUBLICATIONS

Combined Chinese Office Action and Search Report issued Sep. 28, 2021 in corresponding Chinese Patent Application No. 201980034158.1 (with Partial English Translation and English Translation of Category of Cited Documents), 9 pages.

Extended European Search Report issued Jun. 15, 2021 in corresponding European Patent Application No. 19810394.7, 8 pages.

* cited by examiner

STEEL-FRAME CUTTING METHOD AND DEVICE

TECHNICAL FIELD

The present invention relates to a method and an apparatus for cutting a steel frame made of, for example, H-shaped steel or a square pipe, by use of a cutting torch.

BACKGROUND ART

Conventionally, as a method and an apparatus for cutting a steel frame using a cutting torch, those described in Patent Document 1 are known. The apparatus includes a clamp for gripping a steel frame of the steel frame, and moving means for moving the cutting torch along the surface while keeping the fire port of the cutting torch closer to the surface. The gripping of the steel frame and the transfer of the cutting torch by the clamp and the moving means are performed through a remote operation.

The above method of thus moving the fire port of the cutting torch along the surface of the steel frame while keeping the fire port close to the surface takes a long time to complete the cutting. This markedly hinders the improvement of the work efficiency.

CITATION LIST

Patent Literature

Patent Document 1: Japanese Unexamined Patent Publication No. 2007-146571

SUMMARY OF INVENTION

It is an object of the present invention to provide a method and an apparatus capable of efficiently cutting a steel frame in a short time.

To achieve the above-mentioned object, the inventors of the present application have conceived a new cutting method different from the above-mentioned conventional method of moving a fire port of a cutting torch along a steel frame surface. The new cutting method includes locating a cutting torch having a relatively large fire port in a position apart from the steel frame in a direction parallel to the cutting surface, and moving the cutting torch in a feed direction along the cutting surface and perpendicular to a supply direction, while applying a flame toward the steel frame in the supply direction from the cutting torch and supplying cutting oxygen for cutting by oxidation of the steel frame, to thereby cut the steel frame along the cutting surface. This new cutting method allows an operation time to be remarkably shorten as compared with the above-mentioned conventional cutting method in which the cutting torch is moved along the surface of the steel frame.

However, the new cutting method, in which the distance from the fire port to the surface of the steel frame inconstant, is likely to involve a cutting defect in a part of the cutting surface, the part being away from the fire port or hidden behind another portion as seen from the torch, or the like, depending on the size and shape of the cutting surface of the steel frame. Cutting the part thus having failed to be cut may require greatly changing the orientation and position of the large cutting torch and re-supplying flame and cutting oxygen from the opposite side, which rather has a possibility of hindering the work efficiency improvement. Moreover, the temperature of the steel frame that has been heated is lowered during the change of the orientation and position of the cutting torch, which further decreases the efficiency.

To solve such a problem, the present inventors have conceived to move the cutting torch in the first feed direction to cut a part of the cutting surface, and then move the cutting torch from the cutting end position in the second feed direction opposite to the first feed direction with keeping the posture of the cutting torch. Such a reverse movement of the cutting torch makes it possible to efficiently cut a portion which has failed to be cut by the feed in the first feed direction by quickly starting the cutting in the second direction opposite to the first direction before the drop of the temperature of the steel frame which has already been heated by the cutting in the first direction.

The present invention, thus, has been made. Provided is a method for cutting a steel frame along a cutting surface perpendicular to a longitudinal direction of the steel frame, the method comprising: holding the steel frame by a holding device; setting a cutting start position to a position at a first end of the cutting surface or to a position on an outer side of the first end; setting a first cutting end position to a position of a second end of the cutting surface opposite to the cutting start position across the cutting surface or to a position on an outer side of the second end; locating a cutting torch at a position apart from the steel frame held by the holding device in a direction along the cutting surface and moving the cutting torch from the cutting start position to the first cutting end position in a first feed direction perpendicular to a supply direction along the cutting surface with applying a flame in the supply direction from a fire port of the cutting torch and supplying oxygen for oxidation of the steel frame to thereby cut a part of the cutting surface; and stopping the cutting torch at the first cutting end position and thereafter moving the cutting torch in a second feed direction opposite to the first feed direction from the first cutting end position to thereby cut at least a part of a remaining part of the steel frame, the remaining part being a part having failed to be cut by the movement in the first feed direction.

Also provided is a cutting apparatus for cutting a steel frame along a cutting surface perpendicular to a longitudinal direction of the steel frame, the cutting apparatus comprising: a first gripping member and a second gripping member that grip the steel frame in a gripping direction along the cutting surface; a gripping drive unit that moves the first gripping member and the second gripping member in the gripping direction to make the first gripping member and the second gripping member grip and release the steel frame; a cutting torch having a fire port and being capable of supplying a flame and oxygen for oxidation of the steel frame to the steel frame from the fire port; a torch feed unit capable of holding the cutting torch at a position apart from the steel frame in a direction along the cutting surface and in a specific posture where the fire port of the cutting torch is directed to the steel frame and moving the cutting torch in a first feed direction which is a direction along the cutting surface and perpendicular to a supply direction in which the flame and the oxygen are supplied from the fire port and in a second feed direction opposite to the first feed direction while maintaining the specific posture; a gripping position detector that detects respective positions of the first gripping member and the second gripping member; a position setting section that sets a cutting start position to a position of a first end of the cutting surface or to a position on an outer side of the first end with respect to the gripping direction based on the position of the first gripping member and sets a first cutting end position to a position of a second end of the cutting surface opposite to the cutting start position across the cutting surface or to a position on an outer side of the second end with respect to the gripping direction based on the position of the second gripping member; and a cutting control section that controls respective operations of the cutting torch and the torch feed unit so as to move the cutting torch in the first feed direction from the cutting start position to the first cutting end position, while making a flame be applied from the fire port of the cutting torch in the supply direction along the cutting surface and making oxygen for oxidation of the steel frame be supplied, and so as to stop the cutting torch at the first cutting end position and thereafter move the cutting torch from the first cutting end position in the second feed direction opposite to the first feed direction.

DESCRIPTION OF EMBODIMENTS

Hereinafter, embodiments of the present invention will be described in detail with reference to the drawings. The following description of the preferred embodiments is illustrative in nature and is not intended to limit the invention, its application or its usage at all.

Figure 1:
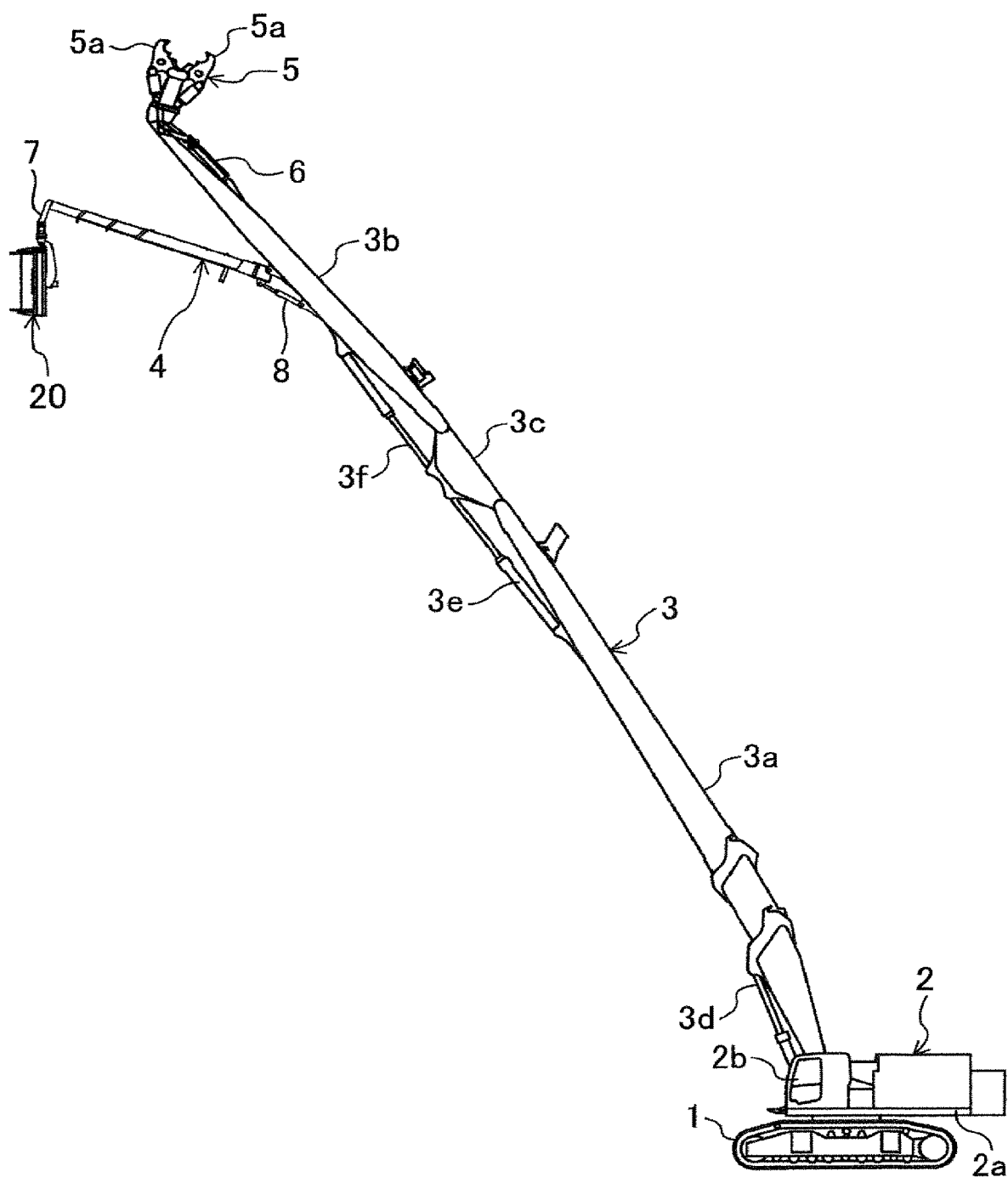
FIG. 1 is a schematic side view showing a demolishing machine which is an example of a work machine on which a cutting apparatus according to each embodiment of the present invention is mounted.

FIG. 1 shows a demolishing machine which is an example of a work machine on which a cutting apparatus according to each embodiment of the present invention described below is mounted. The demolishing machine includes a lower traveling body 1, an upper slewing body 2 mounted on the lower traveling body 1 so as to be slewable, a boom 3, an arm 4, a crushing device 5, and the cutting apparatus. The upper slewing body 2 includes a slewing frame 2a and a cab 2b mounted thereon. The boom 3 is attached to a front portion of the upper slewing body 2 so as to be raiseable and lowerable. The crushing device 5 is removably attached to a distal end portion of the boom 3.

The boom 3, in this embodiment, includes a first boom member 3a, a second boom member 3b, an intermediate member 3c, a first boom cylinder 3d, an intermediate boom cylinder 3f, and a second boom cylinder 3e. The first boom member 3a has a proximal portion attached to the front portion of the upper slewing body 2 so as to be raiseable and lowerable and a distal portion opposite to the proximal portion. The second boom member 3b has a proximal portion and a distal portion opposite thereto, and the crushing device 5 is removably attached to the distal end portion. The intermediate member 3c is interposed between the distal portion of the first boom member 3a and the proximal portion of the second boom member 3b. The first boom cylinder 3d is disposed so as to raise and lower the first boom member 3a relatively to the upper slewing body 2. The intermediate boom cylinder 3f is disposed so as to rotationally move the intermediate member 3c relatively to the first boom member 3a. The second boom cylinder 3e is disposed so as to rotationally move the second boom member 3b relatively to the intermediate member 3c.

The crushing device 5 includes a pair of crushing claws 5a capable of being opened and closed. The crushing device 5 performs crushing motion such as sandwiching the steel frame or twisting off the steel frame while sandwiching it, with respective movements of the pair of crushing claws 5a in opening and closing directions. Between the crushing device 5 and the second boom member 3b is interposed a crusher cylinder 6. The crushing device cylinder 6 expands and contracts so as to rotationally move the crushing device 5.

The cutting apparatus is configured to cut the steel frame while gripping it. The steel frame to be cut has a length and a cutting surface, wherein the length and the shape and size of the cutting surface are not limited. FIGS. 5 to 8 show an example of the cutting surface of the steel frame.

Figure 5:
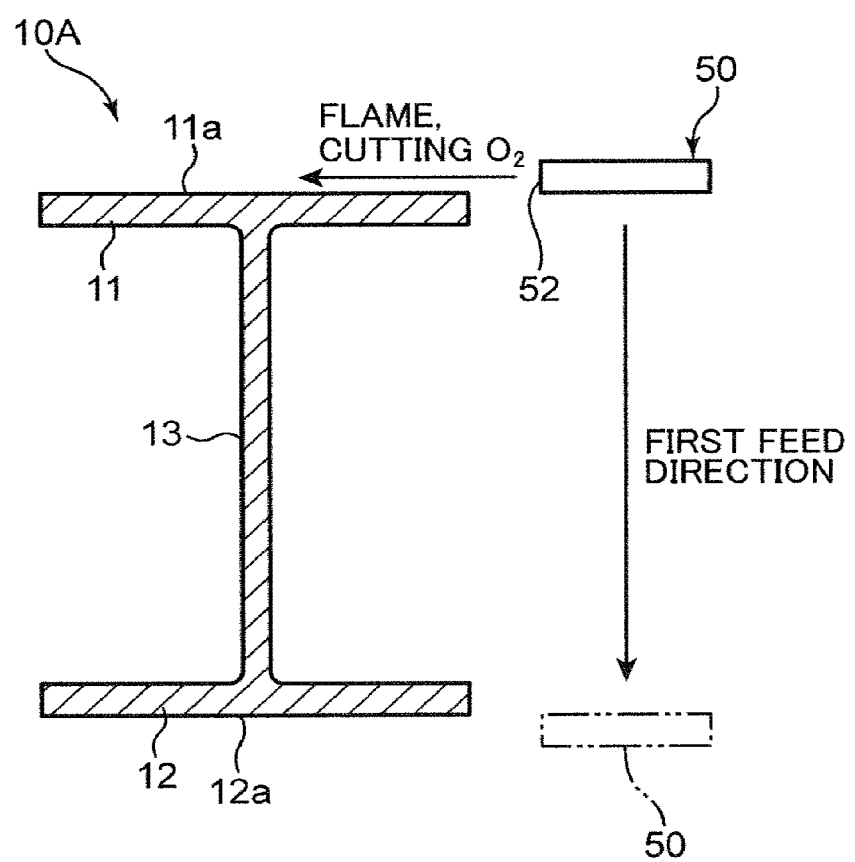
FIG. 5 is a sectional view showing a step of feeding a cutting torch in a first feed direction relatively to a cutting surface of a steel frame made of H-shaped steel.
Figure 6:
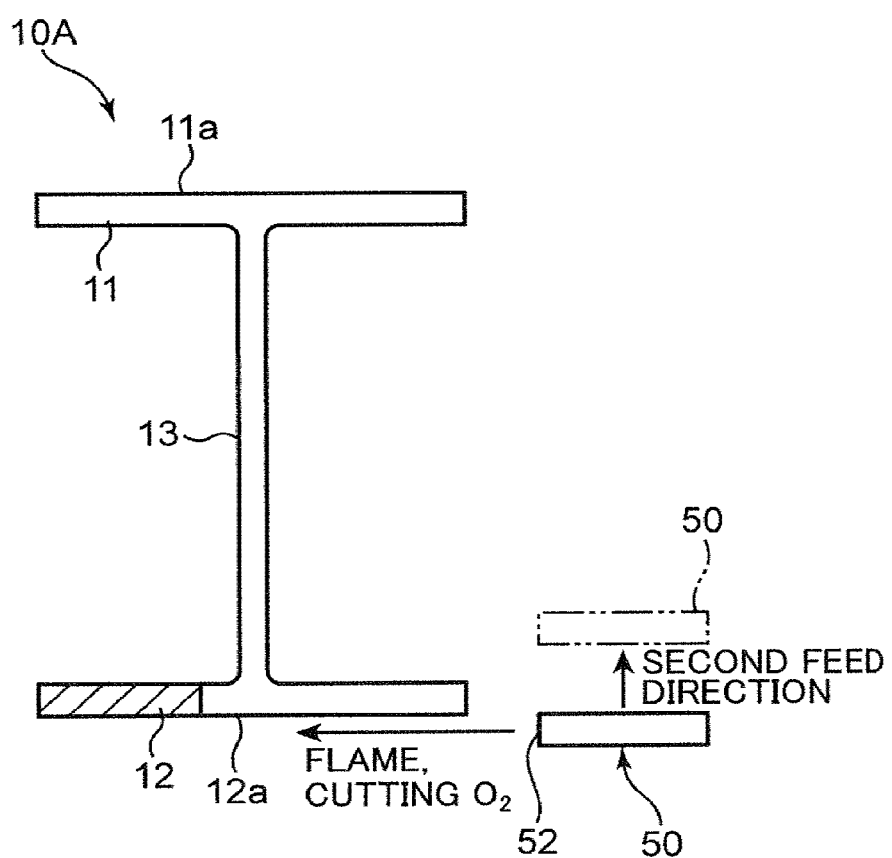
FIG. 6 is a sectional view showing a step of feeding the cutting torch in the second feed direction relatively to the cutting surface of the steel frame made of H-shaped steel.

FIGS. 5 and 6 show a cutting surface of a steel frame 10A made of H-section steel. The steel frame 10A integrally includes a pair of flanges 11, 12 and a web 13. The web 13 extends vertically in the cutting surface, and the pair of flanges 11, 12 protrude from opposite ends of the web 13 to laterally opposite sides in the cutting surface.

Figure 7:
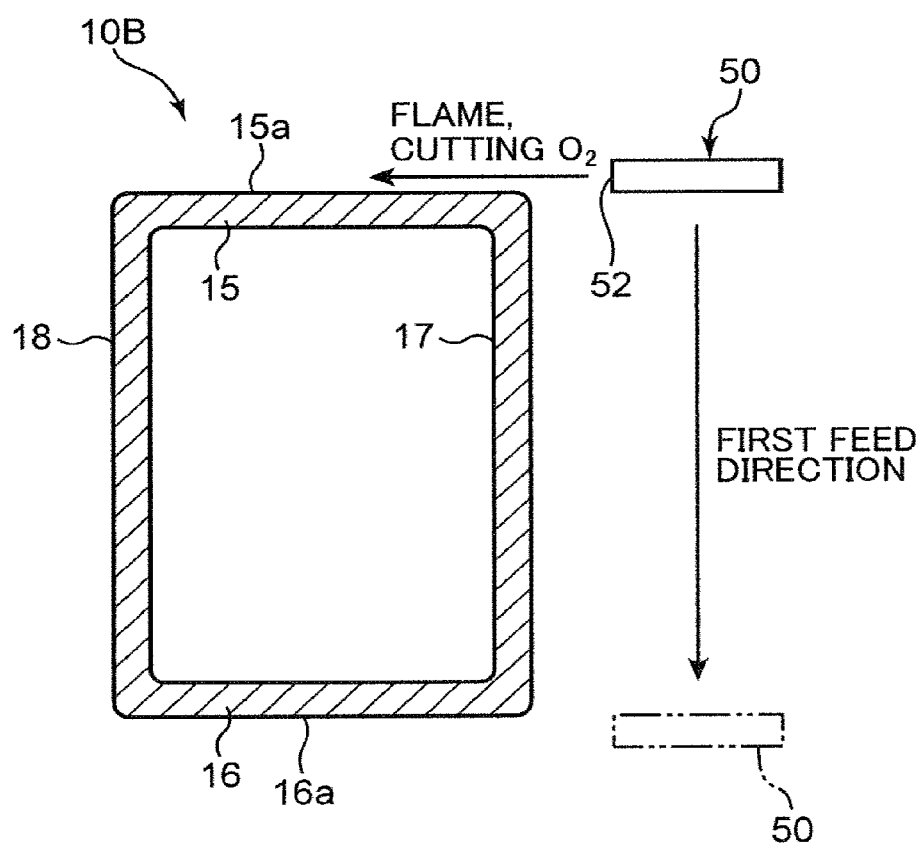
FIG. 7 is a sectional view showing a step of feeding the cutting torch in the first feed direction relatively to a cutting surface of a steel frame made of a square pipe.
Figure 8:
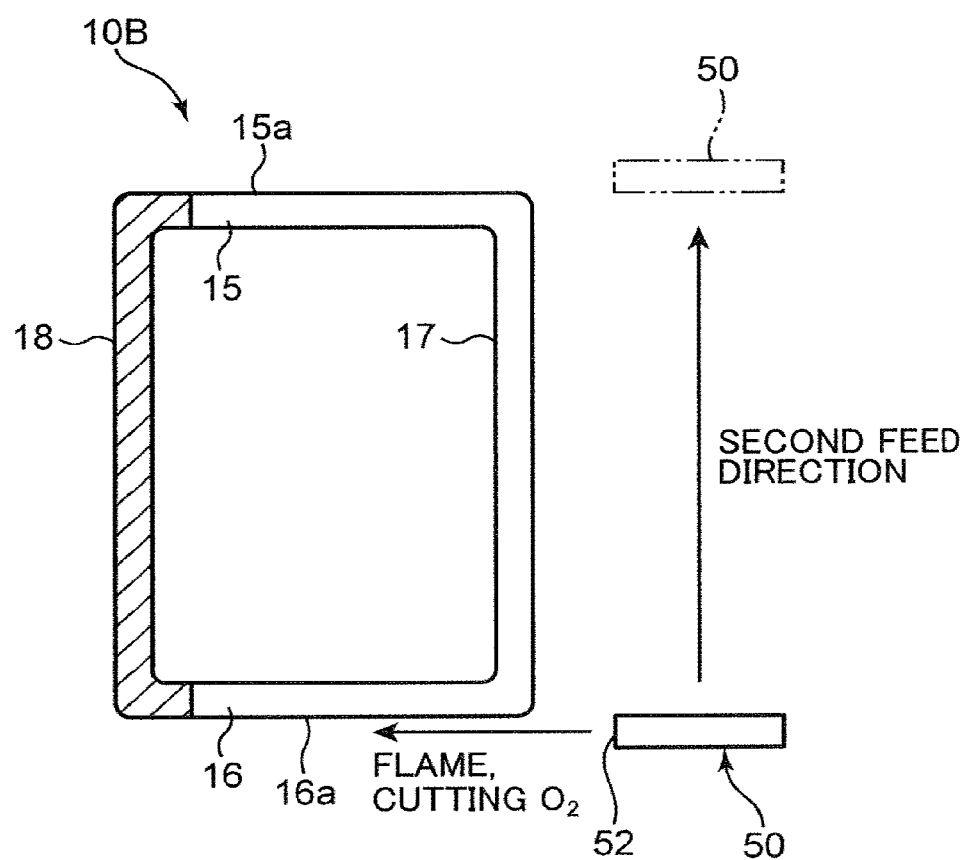
FIG. 8 is a sectional view showing a step of feeding the cutting torch in the second feed direction relatively to the cutting surface of the steel frame made of a square pipe.

FIGS. 7 and 8 show a cutting surface of a steel frame 10B made of a square pipe. The steel frame 10B has a pair of horizontal walls 15 and 16 extending horizontally in the cutting surface, and a pair of vertical walls 17 and 18 extending vertically in the cutting surface. In the transverse section, respective upper ends of the pair of vertical walls 17 and 18 are joined integrally to opposite ends of the horizontal wall 15, respectively, and respective lower ends of the pair of vertical walls 17 and 18 are joined integrally to opposite ends of the horizontal wall 16, respectively.

The cutting apparatus includes a cutting apparatus body 20 which is supported by the arm 14. The structure of the cutting apparatus body 20 is shared by the embodiments described below.

The cutting apparatus body 20 is supported by an intermediate portion of the second boom member 13b through the arm 4. The arm 4 includes a proximal portion rotatably connected to the second boom member 3b and a distal end portion opposite thereto, and the cutting apparatus body 20 is suspended from the distal portion through a suspension member 7. The arm 4 has an expandable structure, for example, a telescopic structure. Between the arm 4 and the second boom member 3b is interposed an arm cylinder 8, which expands and contracts to thereby move the arm 4 rotationally and relatively to the second boom member 3b.

Figure 2:
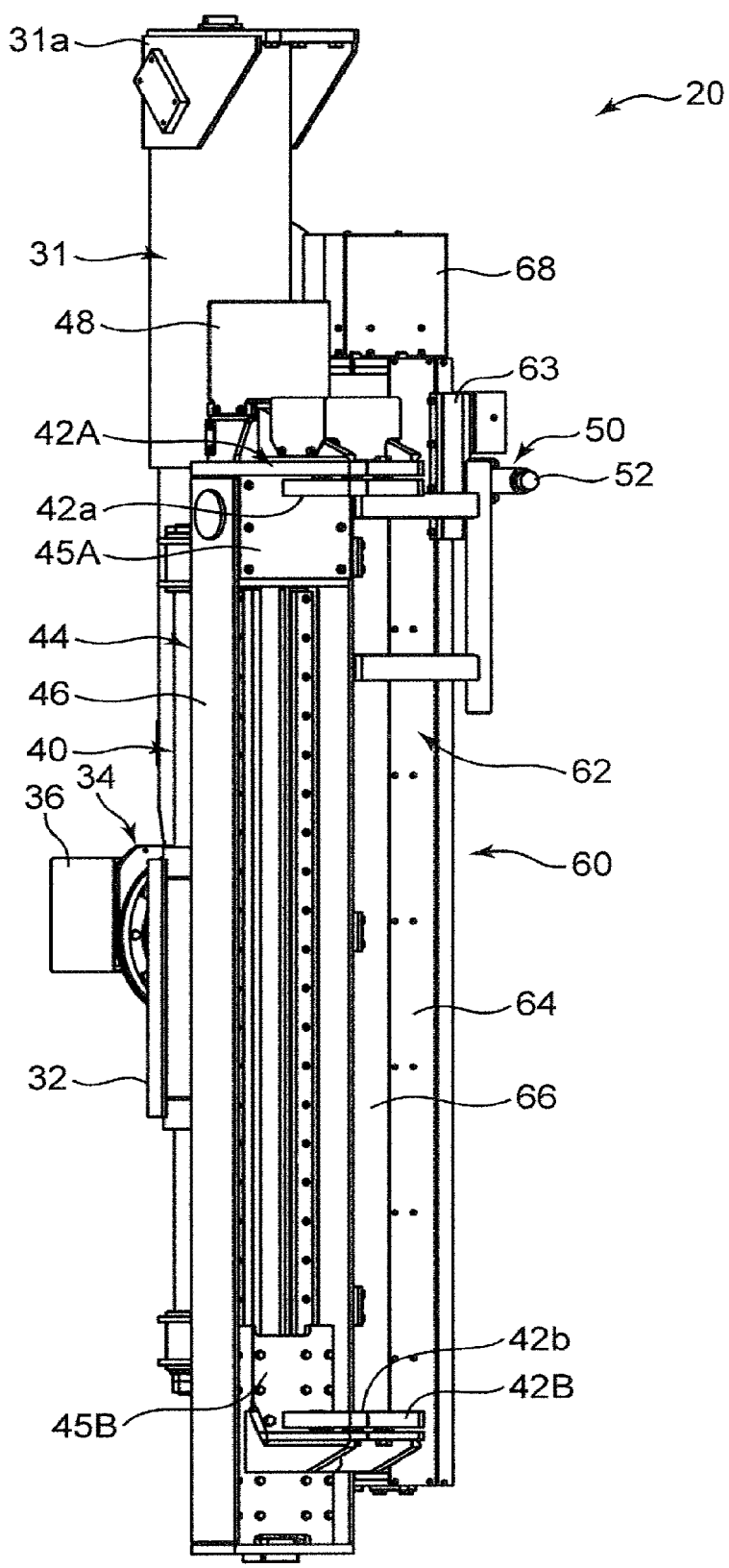
FIG. 2 is a perspective view of a cutting apparatus body of the cutting apparatus as viewed from the left obliquely front.
Figure 3:
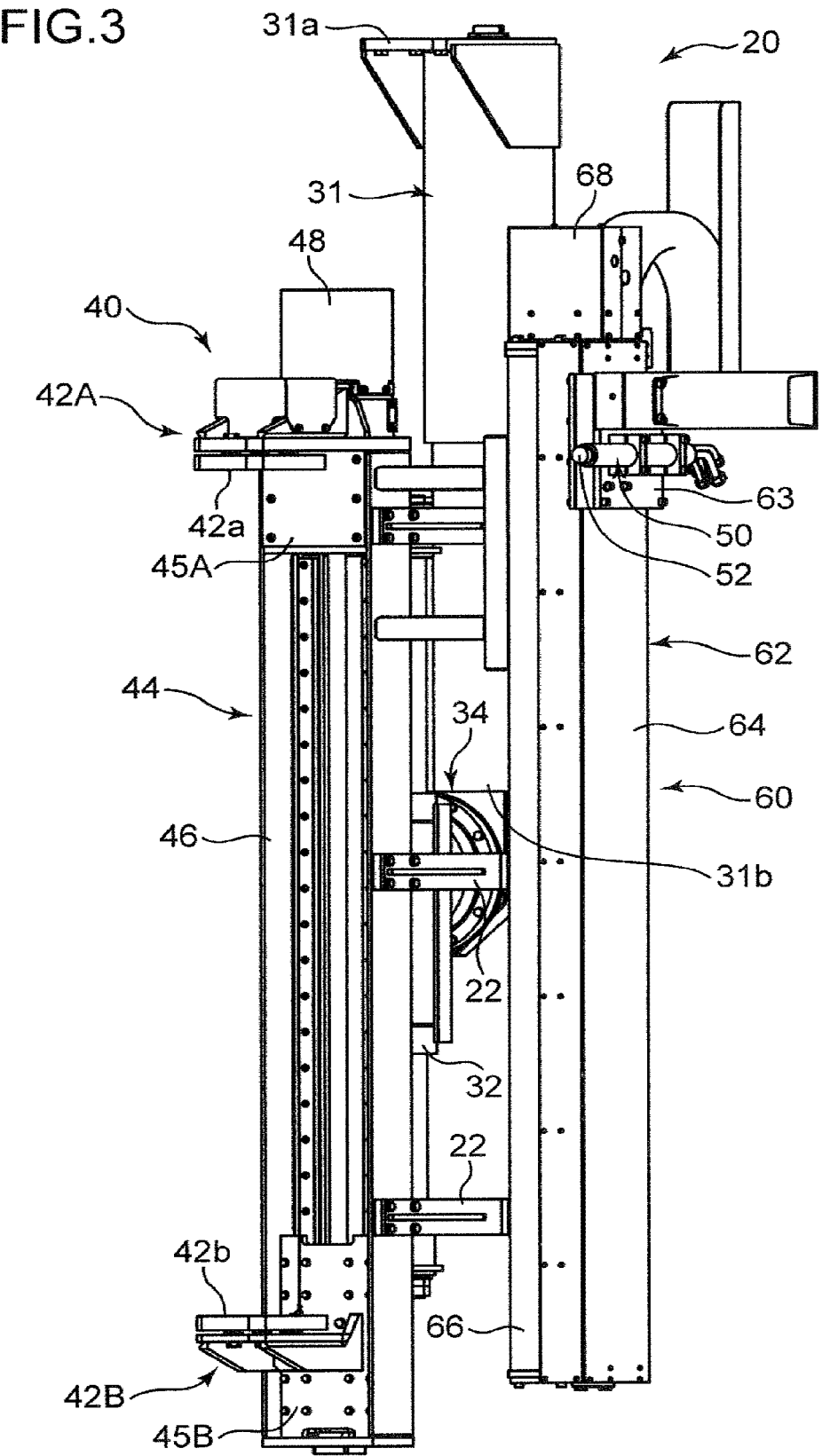
FIG. 3 is a perspective view of the cutting apparatus body as viewed from the right obliquely front.
Figure 4:
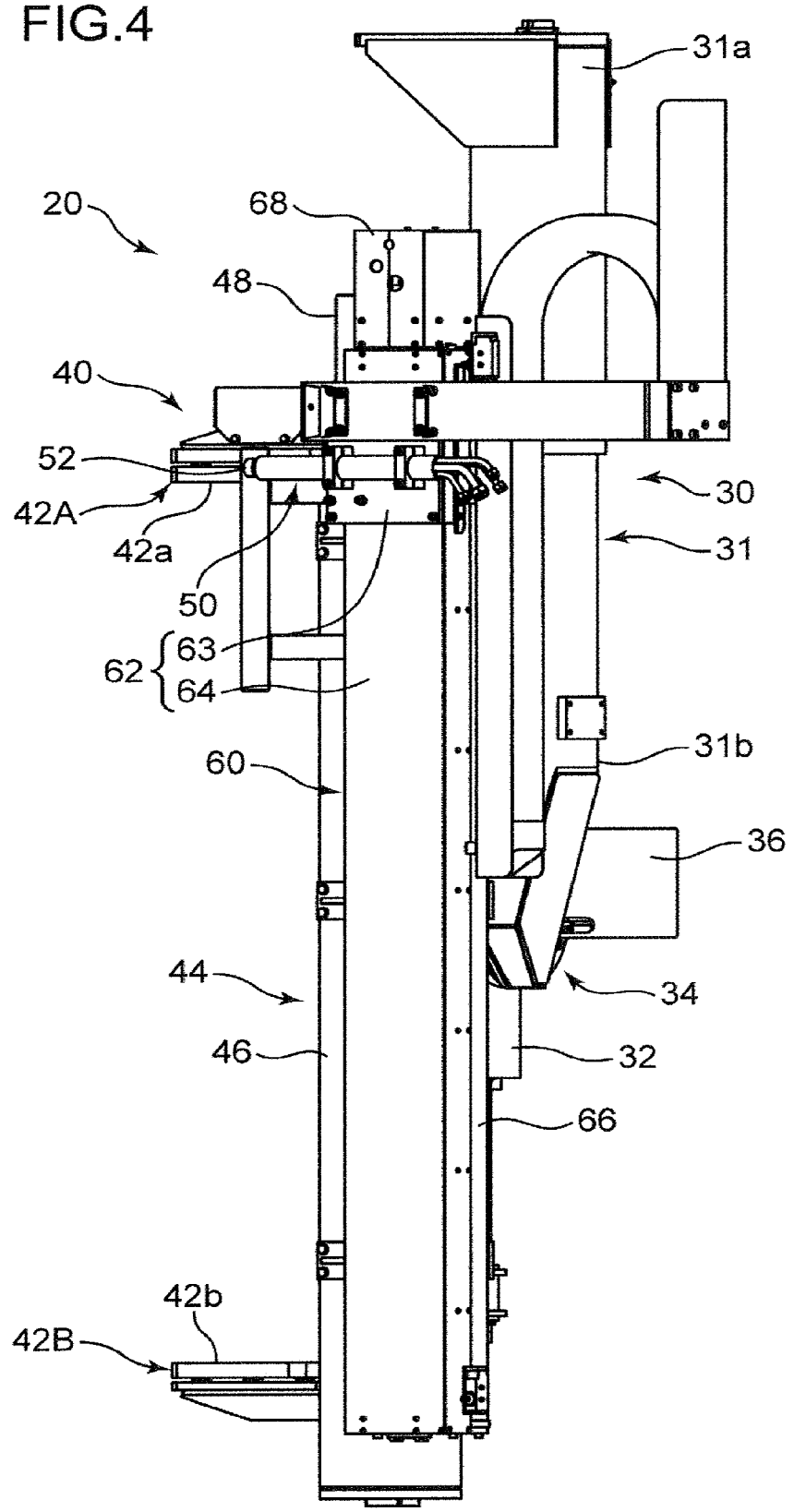
FIG. 4 is a right side view of the cutting apparatus body.

The cutting apparatus body 20 includes a support body 30, a gripping device 40, a cutting torch 50, and a torch feed unit 60, as shown in FIGS. 2 to 4.

The support body 30 is connected to the distal portion of the arm 4 through the suspension member 7, and supports the gripping device 40. In other words, the gripping device 40 is connected to the support body 30 to be supported by the arm 14 through the support body 30.

The support body 30 includes a first support member 31, a second support member 32, a swivel joint unit 34, and a swivel drive motor 36. The first support member 31 has an upper end portion 31a connected to the suspension member 7 and a lower end portion 31b opposite thereto. The second support member 32 is connected to the lower end portion of the first support member 31 through the swivel joint unit 34, and connected to the gripping device 40 to hold it. The swivel joint unit 34 connects the first and second support members 31, 32 to each other so as to allow the second support member 32 to turn relatively to the first support member 31 about an axis in a direction (a horizontal direction in a posture shown in FIGS. 2 to 4) perpendicular to the longitudinal direction of the first support member 31 (a vertical direction in a posture shown in FIGS. 2 to 4). The swivel drive motor 36 is connected to the swivel joint unit 34 and operates to swivel the second support member 32 relatively to the first support member 31.

The gripping device 40 is a holding device connected to the second support member 32 and configured to hold the steel frame. Specifically, the gripping device 40 according to this embodiment is a device for gripping in a gripping direction (vertical direction in the example shown in FIGS. 5 to 8) that is a direction perpendicular to the longitudinal direction of the steel frame and parallel to the cutting surface. The gripping device 40 includes a first gripping member 42A, a second gripping member 42B, and a gripping drive unit 44.

The first and second gripping members 42A, 42B are spaced in the gripping direction and driven by the gripping drive unit 44 to sandwich the steel frame between the first and second gripping members 42A, 42B. The first and second gripping member 42A, 42B have respective gripping surfaces 42a, 42b opposed to each other, being capable of gripping the steel frame in the gripping direction in a state where the gripping surfaces 42a, 42b are pressed against the surface of the steel frame.

The gripping drive unit 44 holds the first and second gripping members 42A, 42B, and moves the first and second gripping members 42A, 42B in the gripping direction to make them grip and release the steel frame. Specifically, the gripping drive unit 44 includes a first holding member 45A, a second holding member 45B, a casing 46, and a not-graphically-shown gripping drive mechanism.

The first and second holding members 45A, 45B are connected to the first and second holding members 42A, 42B to hold the first and second holding members 42A, 42B, respectively. Specifically, the first holding member 45A holds the first gripping member 42A in a posture where the first gripping member 42A protrudes beyond the first holding member 45A in a first protrusion direction perpendicular to the gripping direction. Similarly, the second holding member 45B holds the second gripping member 42B in a posture where the second gripping member 42B protrudes beyond the second holding member 45B in a second protrusion direction parallel to the first protrusion direction.

The casing 46 extends in the gripping direction, being connected to the second support member 32. The casing 46 holds the first and second holding members 45A, 45B so as to allow the first and second holding members 45A, 45B to slide in the gripping direction.

The gripping drive mechanism moves the first and second holding members 45A, 45B in respective directions in which they come close to and separate from each other in the gripping direction (in the opposite directions). The gripping drive mechanism according to this embodiment has a not-graphically-shown feed screw mechanism stored in the casing 46 and a gripping drive motor 48 connected thereto. The feed screw mechanism includes a feed screw which extends along the casing 46 and is rotatably supported by the casing 46, a first nut and a second nut which are fixed to the first and second holding members 45A, 45B, respectively, and screwed to the feed screw. The gripping drive motor 48 drives the feed screw in the forward and reverse directions to thereby move the first and second holding members 45A, 45B in the opening and closing directions, i.e., the directions in which they come close to and separate from each other along the gripping direction.

The feed screw includes one axial half formed with a normal male screw to which the first nut fixed to the first holding member 45A is screwed and the other axial half formed with a reverse male screw to which the second nut fixed to the second holding member 45B is screwed. The first and second holding members 45A, 45B are, therefore, simultaneously driven in opposite directions by the rotation of the feed screw. Alternatively, it is also possible to provide each of the first and second holding members 45A, 45B with a dedicated feed screw and a gripping drive motor.

In the present invention, the mechanism for moving the first and second gripping members is not limited to the feed screw mechanism. The mechanism may be constituted by, for example, a pair of hydraulic cylinders coupled to the first and second gripping members and configured to expand and contract to thereby move the first and second gripping members, respectively. It is also possible to omit the support body 30 and to connect the gripping device 40, for example, the casing 46, to the distal portion of the arm 4.

It is preferable that a position adjustment mechanism is interposed between the casing 46 and the second support member 32. The position adjustment mechanism allows the casing 46 to make relative displacement to the second support member 32 so that the first and second gripping members 42A, 42B can perform excellent gripping even when one of the first and second gripping members 42A, 42B comes into contact with the steel frame prior to the other. The position adjustment mechanism can be constituted by, for example, a spring member, which is arranged to elastically hold the casing 46 in a predetermined normal position with respect to the relative position of the casing 46 to the second support member 32 and to allow the casing 46 to make relative displacement to the second support member 32 in response to a load which acts on only one of the first and second gripping members 42A, 42B due to the contact of the one gripping member with the steel frame prior to the other. Such a position adjustment mechanism enables the first and second gripping members 42A, 42B to smoothly grip the steel frame even when the steel frame is fixed to a certain position in the structure to be prevented from displacement.

The cutting torch 50 supplies cutting oxygen to the steel frame while heating the steel frame to cause an oxidation reaction in the steel frame, thereby cutting the steel frame. Specifically, the cutting torch 50 has a fire port 52 and supplies a flame for heating the steel frame and a cutting oxygen which is oxygen for the oxidation reaction from the fire port 52 to the steel frame.

Figure 9:
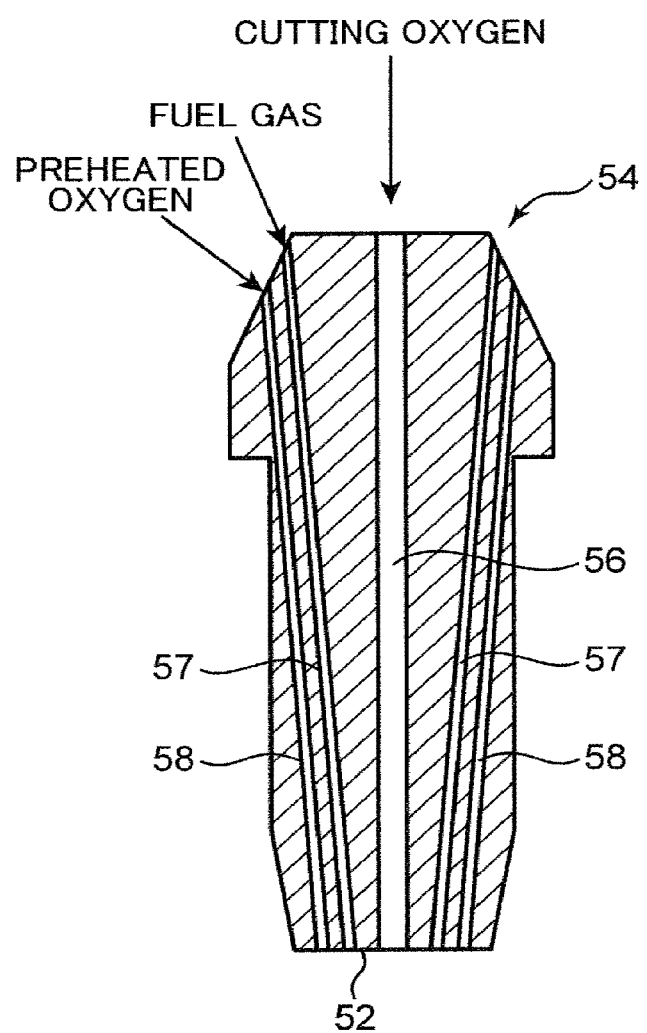
FIG. 9 is a longitudinal cross-sectional view of a tip constituting the cutting torch.

In detail, the cutting torch 50 includes a tip 54 as shown in FIG. 9 and a not-graphically-shown valve device, the tip 54 has a distal end which forms the fire port 52.

The tip 54 is formed with a cutting oxygen flow path 56, a plurality of fuel gas flow paths 57, and a plurality of preheated oxygen flow paths 58 inside the tip 54. The cutting oxygen flow path 56 is located on the center axis of the tip 54. The plurality of fuel gas flow paths 57 and the plurality of preheated oxygen flow paths 58 are coaxially arranged around the cutting oxygen flow path 56. Fuel gas and preheated oxygen for the combustion thereof are injected through the plurality of fuel gas flow paths 57 and the plurality of preheated oxygen flow paths 58, respectively, and a flame is formed by the combustion of the fuel gas. The fuel gas and the preheated oxygen may be injected from the fire port 52 after mixed in a mixer in or upstream of the tip 54.

The valve device includes a plurality of on-off valves disposed upstream of the flow passages 56 to 58, respectively. The on-off valves are interposed between the flow paths 56 to 58 and respective sources of gas (fuel gas or oxygen) and are individually opened and closed so as to be switched between respective states of permitting and preventing the supply of gas from the source to the flow paths 56 to 58.

The torch feed unit 60 is configured to move the cutting torch 50 in the first feed direction and the second feed direction opposite thereto while holding the cutting torch 50 in a specific posture. The specific posture is a posture in which the fire port 52 of the cutting torch 50 is directed to the steel frame at a position apart from the steel frame being gripped by the gripping device 40 in a direction along the cutting surface. The torch feed unit 60 holds the cutting torch 50 in the specific posture and is coupled to the gripping device 40 so as to be capable of moving the cutting torch 50 in the first and second feed directions while maintaining the specific posture. The first feed direction is a direction perpendicular to a supply direction (left direction in the state shown in FIGS. 5 to 8) in which the flame and the oxygen are supplied from the fire port 52, being a direction along the cutting surface (in the cutting apparatus body 20 shown in FIGS. 2 to 4, the direction parallel to the gripping direction; in the state shown in FIGS. 5 to 8, the downward direction). The second feed direction is a direction opposite to the first feed direction (upward in the state shown in FIGS. 5 to 8). In other words, in the cutting apparatus body 20 shown in FIGS. 2 to 4, the torch feed unit 60 and the gripping device 40 are coupled to each other so that the first and second feed directions in which the torch feed unit 60 moves the cutting torch 50 and the gripping direction in which the gripping device 40 grips the steel frame are parallel to each other.

The torch feed unit 60 includes a torch holding section 62, a guide rail 66, and a torch feed mechanism.

The torch holding section 62 is a section for holding the cutting torch 50, including a flat-plate-shaped torch fixing plate 63 and a movable cover 64 extending in a direction parallel to the first and second feed directions (in FIGS. 2 to 4, the vertical direction). The cutting torch 50 is fixed to the torch fixing plate 63, and the torch fixing plate 63 is fixed to the movable cover 64 in a posture where the fire port 52 of the cutting torch 50 faces in the supply direction.

The guide rail 66 is connected to the casing 46 of the gripping device 40 through a plurality of connection plates 22, and supports the movable cover 64 so as to allow the movable cover 64 to move in the first and second feed directions. Specifically, the guide rail 66 has a prismatic shape extending in the first and second feed directions, and the movable cover 64 has a shape slidable along the guide rail 66 while being fitted to the guide rail 66. The guide rail 66 may be connected to the second support member 32 of the support body 30 together with the casing 46 or in place of the casing 46.

The torch feed mechanism moves the torch holding section 62 in the first and second feed directions together with the cutting torch 50 that is held by the torch holding section 62. The gripping drive mechanism according to the embodiment disclosed herein includes a not-graphically-shown feed screw mechanism stored in the guide rail 66 and a torch feed motor 68 coupled to the feed screw mechanism. The feed screw mechanism includes a feed screw which extends along the guide rail 66 and is rotatably supported by the guide rail 66, and a nut fixed to the movable cover 64 and screwed to the feed screw. The torch feed motor 68 drives the feed screw in normal and reverse directions to thereby translate the movable cover 64 and further the cutting torch 50 coupled to the movable cover 64 through the torch fixing plate 63 in the first and second feed directions while maintaining the specific posture of the cutting torch 50.

Figure 10:
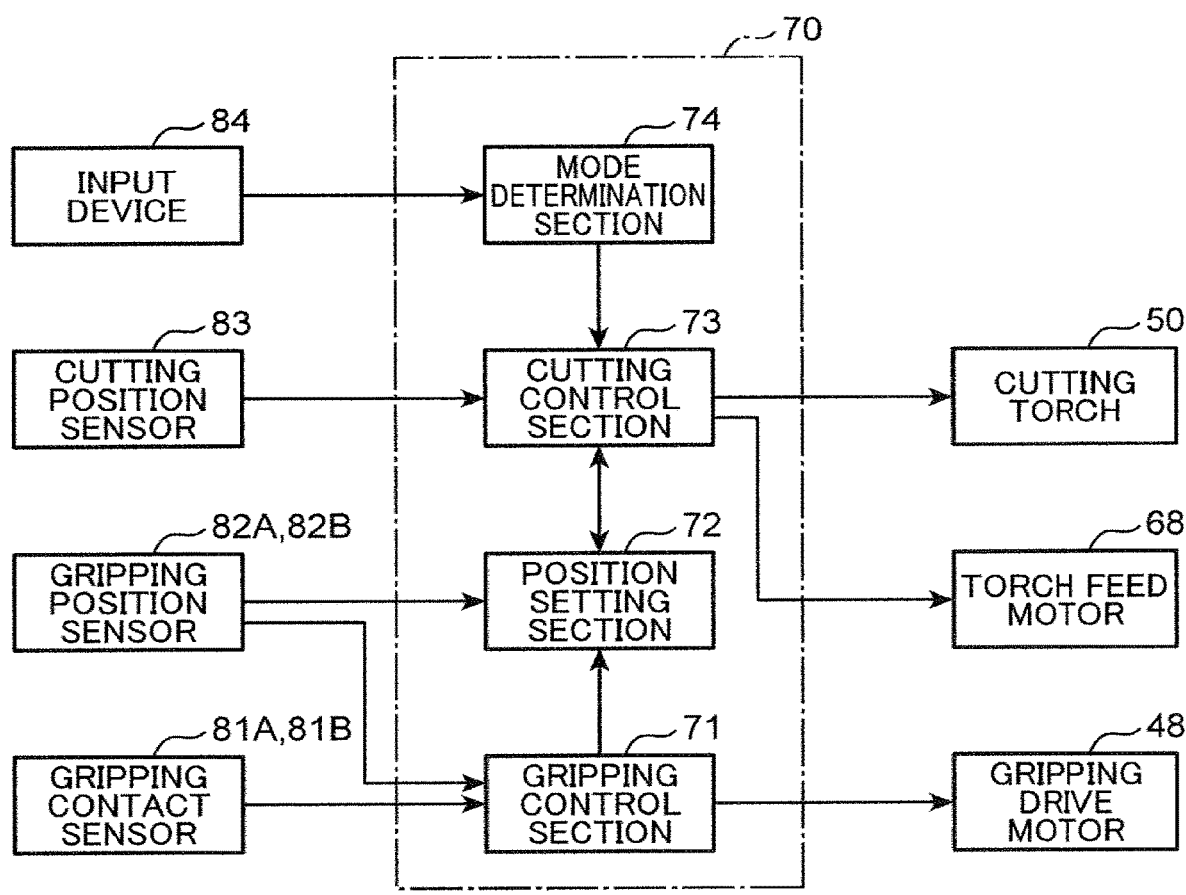
FIG. 10 is a block diagram showing a functional configuration of a controller of the cutting apparatus according to the first embodiment of the present invention.

The cutting apparatus according to the first embodiment of the present invention further includes a controller 70, a plurality of sensors, and an input device 84 as shown in FIG. 10, in addition to the cutting apparatus body 20.

The controller 70 is an arithmetic control device made of, for example, a microcomputer, mounted on the upper slewing body 2 and electrically connected to the cutting apparatus body 20 to control the gripping motion and the cutting motion of the cutting apparatus body 20.

The plurality of sensors generate electrical signals as detection signals as to the operational state of the cutting apparatus body 20 and input them to the controller 70. Specifically, the plurality of sensors include gripping contact sensors 81A, 81B, gripping position sensors 82A, 82B and a cutting position sensor 83.

The gripping contact sensors 81A, 81B are provided to the first and second gripping members 42A, 42B, respectively, to detect whether or not the gripping surfaces 42a, 42b of the first and second gripping members 42A, 42B are in contact with the surfaces of the steel frame to be cut, respectively. The surfaces of the steel frame are, for example, respective outer surfaces 11a, 12a of the flanges 11, 12 in the steel frame 10A shown in FIGS. 5 and 6, and respective outer surfaces 15a, 16a of the horizontal walls 15, 16 in the steel frame 10B shown in FIGS. 7 and 8. The gripping contact sensors 81A and 81B are formed of, for example, load cells that generate electric signals corresponding to respective contact pressures between the gripping surfaces 42a, 42b and the surfaces of the steel frame, respectively, each inputting the electric signal to the controller 70 as a gripping contact detection signal.

The gripping position sensors 82A and 82B are gripping position detectors for detecting the first gripping position and the second gripping position, respectively. The first gripping position and the second gripping position are respective positions of the first and second gripping members 42A, 42B with respect to the gripping direction, more specifically, respective positions of the gripping surfaces 42a, 42b. Each of the gripping position sensors 82A and 88B can be formed by, for example, a distance sensor, which is provided at a predetermined position in the casing 46 of the gripping device 40 to detect respective distances in the gripping direction from the predetermined position to predetermined parts of the first and second gripping members 42A, 42B. Alternatively, the gripping position detector may be an encoder that detects the amount of rotation of the gripping drive motor 48. The gripping position sensor 82A, 82B generate respective electrical signals corresponding to the information about the first and second gripping positions, and input them as gripping position detection signals to the controller 70.

The cutting position sensor 83 is a cutting position detector for detecting a cutting position which is a position of the cutting torch with respect to each of the first and second feed directions. The cutting position sensor 83 can be formed by, for example, a distance sensor, which is provided at a predetermined position in the guide rail 66 of the torch feed unit 60 to detect distances in the first and second feed directions from the predetermined position to a predetermined part of the cutting torch 50 or the torch holding section 62. The cutting position detector, alternatively, may be an encoder that detects the amount of rotation of the torch feed motor 68. The cutting position sensor 83 generates an electrical signal corresponding to the information about the cutting position and inputs it as a cutting position detection signal to the controller 70.

The input device 84 includes, for example, an operation panel, functioning as an information input unit for allowing an information input operation to be applied to the input device 84 by an operator. The information input operation is an operation applied to the input device 84 by the operator to input cutting surface information to the controller 70. The cutting surface information is information about the cutting surface of the steel to be cut, for example, the shape and size of the cutting surface as shown in FIGS. 5-8. The input device 84 inputs the cutting surface information as an electrical signal to the controller 70.

The controller 70 controls the motion of the cutting apparatus body 20. As the function for the control, the controller 70 includes, as shown in FIG. 10, a gripping control section 71, a position setting section 72, a cutting control section 73 and a mode determination section 74.

The gripping control section 71 controls the driving of the gripping device 40 based on the presence or absence of the contact detected by the gripping contact sensors 81A, 81B and the information about the first and second gripping positions detected by the gripping position sensor 82. Specifically, the gripping control section 71 inputs a control signal to the gripping drive motor 48 to thereby control the operation of the gripping drive motor 48.

The position setting section 72 determines the cutting start position, the first cutting end position and the second cutting end position based on the first and second gripping positions detected by the gripping position sensor 82.

The cutting start position is a position for activating the cutting torch 50 to start cutting the steel frame at the position. The position setting section 72 sets the cutting start position to the position of one end of the cutting surface with respect to the gripping direction (the position of the outer surface 11a of the upper flange 11 in FIG. 5; the position of the outer surface 15a of the upper horizontal wall 15 in FIG. 7) or a position on outer side (on the upper side in FIGS. 5 and 7) of the one end, based on the first gripping position when the gripping of the steel frame by the first and second gripping member 42A, 42B is completed (the position of the gripping surface 42a of the first gripping member 42A).

The first cutting end position is a position at which the first cutting by moving the cutting torch 50 from the cutting start position in the first feed direction as shown in FIGS. 5 and 7 is to be ended. The position setting section 72 sets the first cutting end position to the position of the other end of the cutting surface opposite to the cutting start position with respect to the gripping direction (the position of the outer surface 12a of the lower flange 12 in FIG. 6; the position of the outer surface 16a of the lower horizontal wall 16 in FIG. 8) or a position on an outer side (the lower side in FIGS. 6 and 8) of the other end, based on the second gripping position when the gripping is completed (the position of the gripping surface 42b of the second gripping member 42B).

The second cutting end position is a position at which the second cutting by moving the cutting torch 50 from the first cutting end position in the second feed direction as shown in FIGS. 6 and 8 is to be ended. The position setting section 72 sets the second cutting end position based on the cutting surface information. For example, in the cutting of the steel frame 10A made of H-shaped steel as shown in FIGS. 5 and 6, the existence of the web 13 in the vicinity of the first cutting end position tends to prevent cutting oxygen from being supplied smooth to the lower flange 12 to thereby make a part of the lower flange 12 hard to cut; hence, the position setting section 72 sets the second cutting end position to a position immediately above the lower flange 12. Besides, in the cutting of the steel frame 10B made of the rectangular pipe as shown in FIGS. 7 and 8, the existence of the vertical wall 17 on the near side tends to prevent cutting oxygen from being supplied smooth to the vertical wall 18 on the far side to thereby make the entire vertical wall 18 hard to cut; hence, the position setting section 72 sets the second cutting end position at a position equivalent to the cutting start position.

The cutting control section 73 inputs control signals to the cutting torch 50 and the torch feed motor 68 of the torch feed unit 60 to thereby control the operation of cutting the steel frame performed by the cutting torch 50. The cutting control section 73 has cutting control modes each being a mode for controlling the cutting operation, namely, a first control mode and a second control mode. In the first control mode, the cutting control section 73 makes the cutting torch 50 be moved in the first feed direction from the cutting start position to the first cutting end position while making a flame be applied in the supply direction along the cutting surface from the fire port 52 of the cutting torch 50 (in the left direction in FIGS. 5-8) and making cutting oxygen for oxidation of the steel frame be supplied, and stops the operation and movement of the cutting torch 50 as it is at the time when the cutting torch 50 arrives at the first cutting end position to end the cutting operation. In the second control mode, the cutting control section 73 controls respective operations of the cutting torch 50 and the torch feed unit 60 so as to further move the cutting torch 50 in the second feed direction, after stopping the cutting torch 50 at the first cutting end position, from the first cutting end position, and to stop the operation and movement of the cutting torch at the second cutting end position to thereby end the cutting operation.

The mode determination section 74 constitutes a mode switching unit in cooperation with the input device 84. The mode determination section 74 determines the cutting control mode of the cutting control section 73 based on the input of the cutting surface information by the information input operation applied to the input device 84. For example, in the case where the width dimension of the cutting surface, i.e., the dimension in a direction parallel to the supply direction (the dimension in the lateral direction in FIGS. 5 to 8) is so large or the shape of the cutting surface is so complicated as to generate a possibility of failing to cut the back portion of the cutting surface (the left portion in FIGS. 5 to 8) with respect to the supply direction by only the movement of the cutting torch 50 in the first feed direction, the mode determination section 74 determines the cutting control mode to the second control mode. Conversely, in the case where the width dimension of the cutting surface is small or the shape of the cutting surface is relatively simple enough to allow sufficient cutting of the cutting surface to be performed by only the movement of the cutting torch 50 in the first feed direction, the mode determination section 74 determines the cutting control mode to the first control mode.

Next will be described an example of a method for cutting a steel frame using the cutting apparatus with reference to the flowchart of FIG. 11. The flowchart shows an arithmetic control operation performed by the cutting control section 73 of the controller 70.

1) Initial State

In the initial state before the performance of the cutting operation of the steel frame, the gripping control section 71 and the cutting control section 73 of the controller 70 control the gripping drive unit 44 and the torch feed unit 60, respectively, so as to set the first and second gripping members 42A, 42B of the gripping device 40 and the cutting torch 50 to their respective initial positions. The initial positions of the first and second gripping members 42A, 42B are, for example, positions where the first and second gripping members 42A, 42B are most separated from each other as shown in FIGS. 2 to 4. The initial position of the cutting torch 50 is, for example, the farthest position from the first gripping member 42A to the opposite side to the second gripping member 42B (the uppermost position in FIGS. 2 to 4).

2) Positioning of the Cutting Apparatus Body 20 to the Steel Frame

The positioning of the cutting apparatus body 20 to the steel frame is performed by the movements of the boom 3 and the arm 4 through operations performed by an operator in the cab 2b. Specifically, the cutting apparatus body 20 is set at such a position that the steel frame is interposed between the first and second gripping members 42A, 42B with respect to the gripping direction to enable the steel frame to be gripped.

3) Gripping of Steel Frame

Following the completion of the above-described positioning, for example, by application of an operation to a gripping command switch by an operator, the gripping control section 71 of the controller 70 inputs a control signal to the gripping drive motor 48 of the gripping drive unit 44 to make the gripping drive motor 48 drive the first and second gripping members 42A, 42B in respective directions in which they come close to each other. At the time when the gripping contact sensors 81A and 81B detect respective contacts of the gripping surfaces 42a, 42b of the first and second gripping members 42A, 42B with the surfaces of the steel frame, the gripping control section 71 stops the operation of the gripping drive motor 48 to end the gripping operation.

If the position of the steel frame is variable (e.g., in a state where the steel frame is simply laid at a predetermined position), the steel frame can be finally sandwiched between the first and second gripping member 42A, 42B, even when either one of the first and second gripping member 42A, 42B comes into contact with the steel frame prior to the other, because of the appropriate displacement of the steel frame. Besides, if a position adjusting mechanism is provided between the casing 46 of the gripping device 40 and the second support member 32 to allow their relative displacements as described above, the first and second gripping members 42A, 42B can smoothly grip the steel frame even when the steel frame is fixed in the structure to be prevented from displacement. With no position adjusting mechanism, only one contact pressure of the gripping surface of the gripping member that contacts the steel frame in advance among the first and second gripping members 42A, 42B against the steel frame is increased; in this case, it is preferable that the gripping control section 71 performs a control operation such as, for example, stopping the gripping motion once and giving a warning to urge the operator to adjust the position of the gripping device 40.

In any of the above cases, at the stage where the gripping operation is completed, respective positions of the first and second gripping members 42A, 42B detected by the gripping position sensors 82A, 82B (precisely, the first gripping position and the second gripping position which are the positions of the respective gripping surfaces 42a, 42b) correspond to the positions of opposite ends of the gripped steel frame in the gripping direction, respectively. Specifically, the positions of opposite ends of the steel frame 10A in the gripping direction shown in FIGS. 5 and 6 are respective positions in the outer surface 11a, 12a of the upper and lower flanges 11, 12, and the positions opposite ends of the steel frame 10B in the gripping direction shown in FIGS. 7 and 8 are respective positions of the outer surfaces 15a, 16a in the upper and lower horizontal walls 15 and 16.

4) Cutting Operations

Figure 11:
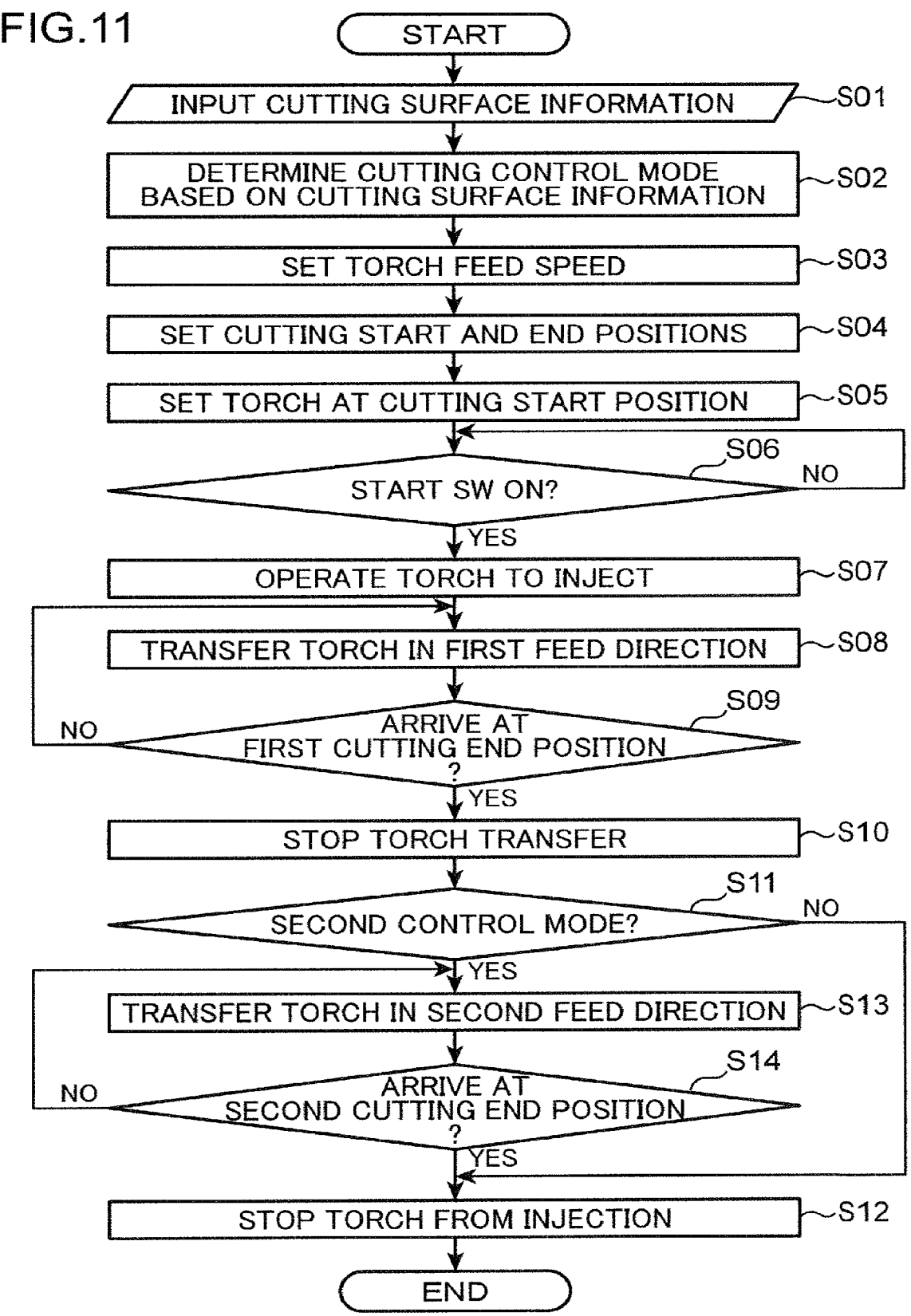
FIG. 11 is a flowchart showing an arithmetic control operation for the cutting control of the controller according to the first embodiment.

Following the completion of the gripping of the steel frame by the gripping device 40 as described above, a series of cutting operations as shown in the flowchart of FIG. 11 are performed.

First, the operator inputs cutting surface information as to the steel frame to the input device 84 in step S01 of FIG. 11. The mode determination section 74 of the controller 70 determines the cutting control mode of the cutting control section 73 to the first control mode or the second control mode, based on the input cutting surface information (step S02).

The cutting control section 73 of the controller 70, based on the cutting surface information and the determined cutting control mode, sets a torch feed speed, which is the speed of transfer of the cutting torch 50 by the torch feed motor 68, depending on region (stop S03). For example, in the steel frame 10A shown in FIG. 5, where the dimensions (the width dimension of the flange 11, 12) of the cutting surface in the supply direction (the direction in which the cutting oxygen is applied and the flame is applied) are large in the opposite end regions where the flanges 11, 12 exist, respectively, the cutting control section 73 sets the torch feed speed at the opposite end regions to a low speed. On the other hand, in the intermediate region, where the web 13 is present and the size of the cutting surface in the supply direction (the width dimension of the web 13) is small, the cutting control section 73 sets the torch feed speed to a high speed.

Meanwhile, the position setting section 72 of the controller 70 sets a cutting start position and a cutting end position based on the determined cutting control mode (step S04). For example, when the cutting control mode is the first control mode, the position setting section 72 sets the cutting start position to a position equivalent to the first gripping position which is the position of the gripping surface 42*a* of the first gripping member 42A or the position on the outer side in the gripping direction (the upper side in FIGS. 5-8) of the first gripping position and sets the first cutting end position to a position equivalent to the second gripping position which is the position of the gripping surface 42*b* of the second gripping member 42B or the position on the outer side in the gripping direction (the lower side in FIGS. 5-8) of the second gripping position. When the cutting control mode is the second control mode, the position setting section 72 sets the second cutting end position based on the cutting surface information, in addition to the cutting start position and the first cutting end position. The position setting section 72 sets the second cutting end position to, for example, the position slightly above the lower flange 12 in the steel frame 10A shown in FIGS. 5 and 6, or sets to substantially the same position as the cutting start position in the steel frame 10B shown in FIGS. 7 and 8.

Following the completion of the setting of the cutting start position and the cutting end positions as described above, the cutting control section 73 inputs a control signal to the torch feed motor 68 to move the cutting torch 50 from the initial position thereof to locate the cutting torch 50 to the cutting start position that is set (step S05). Thereafter, at the time when the not-graphically-shown start switch provided in the cab 2*b* (or it may be provided in the input device 84) is turned on by the operator (YES in step S06), the cutting control section 73 inputs a control signal to the cutting torch 50 to make predetermined gases (fuel gas, preheat oxygen for burning it, and cutting oxygen for oxidation of the steel frame) be injected (step S07), and inputs a control signal to the gripping drive motor 48 to make the cutting torch 50 be moved from the cutting start position toward the first cutting end position in the first feed direction (for example, in FIGS. 5 and 7 direction) (step S08). This enables the cutting torch 50 to supply cutting oxygen while applying a flame to the steel frame in the supply direction, to cut (fuse) the steel frame sequentially along the first feed direction.

During movement of the cutting torch 50, the cutting position sensor 83 detects the position of the cutting torch 50, namely, the cutting position, in real time, and inputs a detection signal on the cutting position to the controller 70. At the time when the position of the cutting torch 50 matches the first cutting end position, that is, at the time when the cutting torch 50 arrives at the first cutting end position (YES in step S09), the cutting control section 73 of the controller 70 stops the transfer of the cutting torch 50 (step S10). Thus, the cutting torch 50 is stopped at the first cutting end position.

If the determined cutting control mode, at this time, is the first control mode (NO in step S11), the cutting control section 73 stops the cutting torch 50 from injecting gas as it is (step S12) to complete the cutting operation. In contrast, if the cutting control mode is the second control mode (YES in step S11), the cutting control section 73 operates the gripping drive motor 48 in the reverse direction without stopping the injection. Thus, the gripping drive motor 48 is actuated so as to move the cutting torch 50 from the first cutting end position in the second feed direction opposite to the first feed direction (step S13). The cutting control section 73, thereafter, stops the injection from the cutting torch 50 at the time when the cutting torch 50 arrives at the second cutting end position (step S12) to complete the cutting operation.

The above-described cutting method includes locating the cutting torch 50 having a relatively large fire port 52 at a position apart from the steel frame in a direction parallel to the cutting surface (the position apart rightward in FIGS. 5 to 8) and moving the cutting torch 50 in a direction along the cutting surface and perpendicular to the supply direction (in the first feed direction and the second feed direction; downward and upward in FIGS. 5 to 8), while applying a flame toward the steel frame from the fire port 52 in the supply direction along the cutting surface (leftward in FIGS. 5 to 8) and supplying cutting oxygen for cutting by oxidation of the steel frame, thereby making it possible to efficiently cut the steel frame in a short time.

Figure 12:
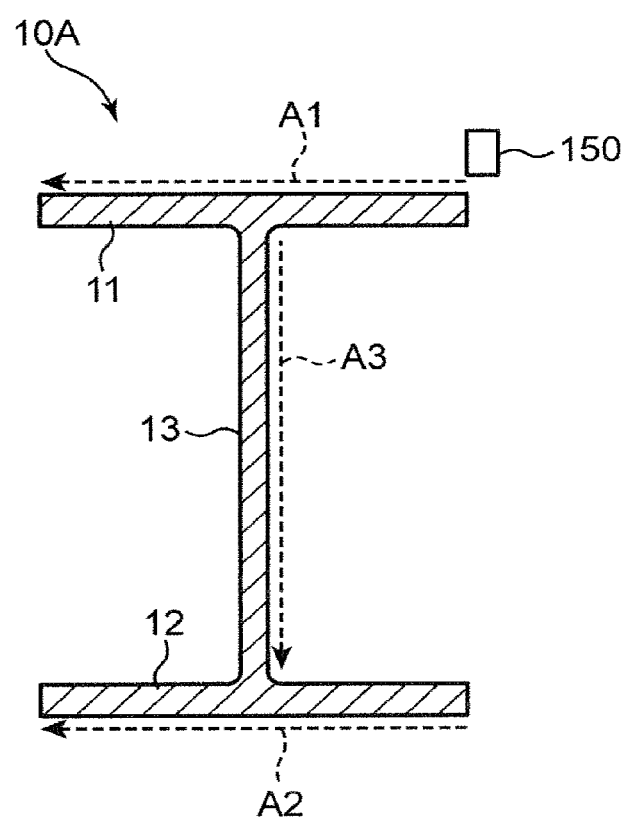
FIG. 12 is a cross-sectional view showing an example of a conventional cutting method.

For example, the conventional method steel as shown in FIGS. 5 and 6, that is, the method of moving the cutting torch 150 along the surface of the steel frame 10A while keeping the cutting torch 150 close to the surface of the steel frame 10A as shown in FIG. 12, does not allow the work over a long period of time to be avoided. This is because, as indicated by arrows A1, A2 and A3 in FIG. 12, a total of three torch feeds have to be made with changing the orientation and feed direction of the cutting torch 150 for each of the flanges 11, 12 and web 13. In contrast, the cutting method shown in the flowcharts of FIGS. 5 to 8 and 11 makes it possible to efficiently cut the steel frame by simply moving the cutting torch 50 along the specific first and second feed directions while keeping the direction of the cutting torch 50 always constant.

Furthermore, even if a part of the steel frame has failed to be cut by the movement of the cutting torch 50 in the first feed direction from the cutting start position to the first cutting end position to remain in the steel frame, the cutting method allows the remaining uncut part to be efficiently cut. This is because moving the second feed direction opposite to the first feed direction without changing the posture of the cutting torch 50 from the first cutting end position enables cutting to be restarted quickly before the temperature of the steel frame heated by the previous cutting is lowered.

For example, in the case of the steel frame 10A shown in FIG. 5, where the cutting oxygen cannot be sufficiently supplied due to the presence of the web 13 during the movement of the cutting torch 50 in the first feed direction, there is likely to remain an uncut part in the lower flange 12 as shown in FIG. 6. However, reversing the cutting torch 50 from the first cutting end position at the outer surface 12*a* of the lower flange 12 or on the outer side thereof enables the uncut part of the lower flange 12 to be effectively cut by the supply of sufficient cutting oxygen. Similarly, in the case of the steel frame 10B shown in FIG. 7, where the vertical wall 18 of the far side as shown in FIG. 6 is likely to be uncut due to the presence of the vertical wall 17 of the near side during the movement of the cutting torch 50 in the first feed direction. However, also in this case, reversing the cutting torch 50 from the first cutting end position enables the uncut part of the lower flange 12 to be effectively cut before the temperature of the vertical wall 17 is significantly lowered.

Furthermore, the cutting control section 73 of the cutting apparatus, which has both the first control mode of making the cutting operation be ended at the first cutting end position and the second control mode of making re-cutting by the further movement of the cutting torch 50 in the second feed direction from the first cutting end position, enables an operator to select the most efficient cutting control mode from among the first and second control modes according to the shape and size of the cutting surface of the steel, thereby allowing high-efficiency cutting adapted to the cutting surface to be always performed. More specifically, in the cutting apparatus according to the first embodiment, the mode determination section determines the cutting control mode based on the cutting surface information that is input through the input device 84 as the information input section, and the cutting control section 73 executes the cutting control based on the determined cutting control mode. This enables the cutting control suitable for the cutting surface to be automatically executed by mere input of the cutting surface information by an operator.

Next will be described a second embodiment of the present invention with reference to FIGS. 13 and 14.

Figure 13:
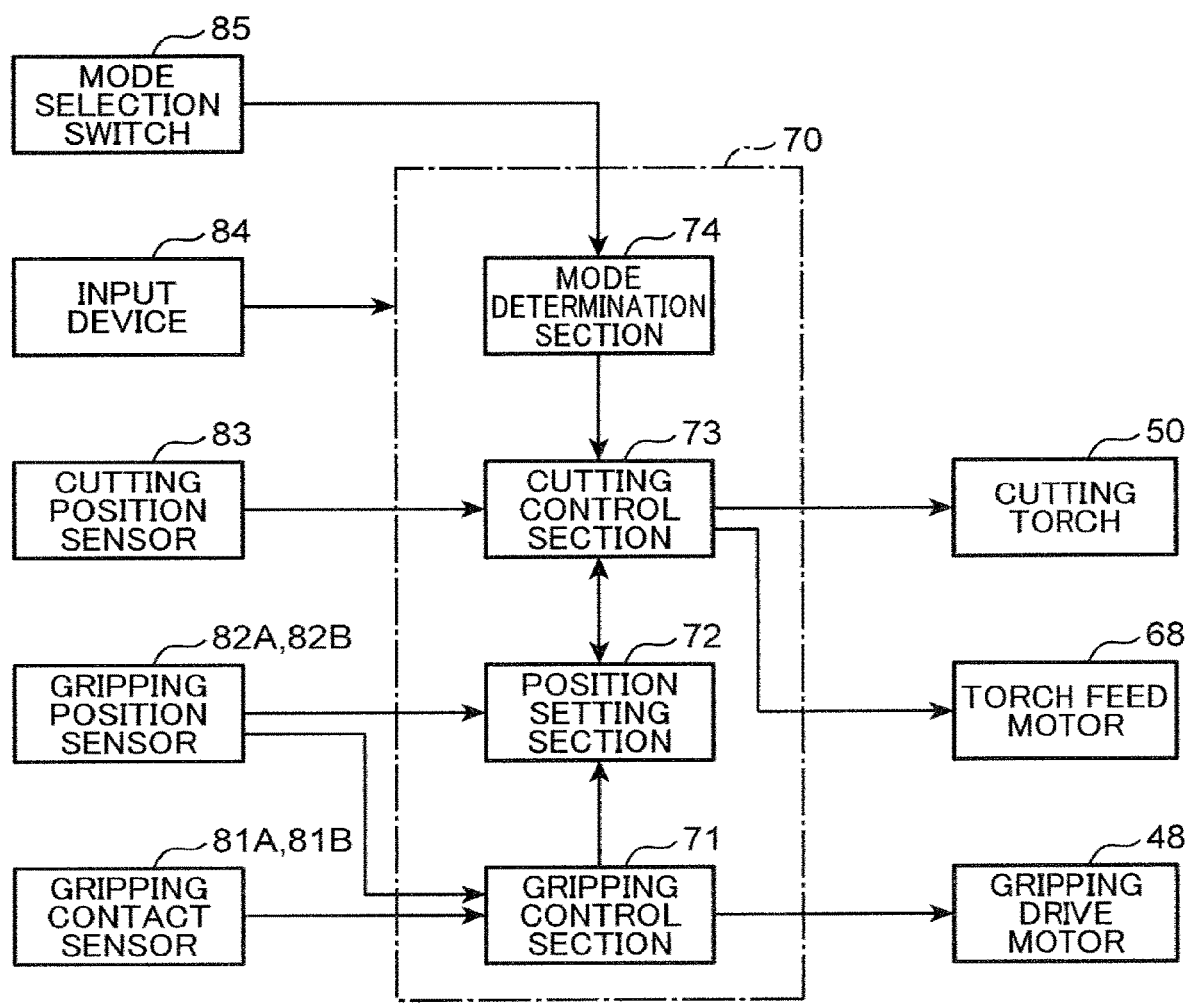
FIG. 13 is a block diagram showing a functional configuration of a controller of a cutting apparatus according to a second embodiment of the present invention.

FIG. 13 shows a functional configuration and input/output signals with respect to the controller 70 according to the second embodiment. Although the controller 70, similarly to the same according to the first embodiment, includes the gripping control section 71, a position setting section 72, a cutting control section 73 and a mode determination section 74, a mode selection switch 85 is connected to the controller 70, in addition to or in place of the input device 84.

The mode selection switch 85 functions as a selection input unit for allowing a selection command input operation to be applied to the mode selection switch 85 by an operator. The selection command input operation is an operation applied to the mode selection switch 85 to input a selection command to the controller 70, and the selection command is a command for selecting the cutting control mode of the cutting control section 73 of the controller 70. The operator, accordingly, can select and designate the cutting control mode to be executed from the first control mode and the second control mode by applying the selection command input operation to the mode selection switch 85. The mode determination section 74 determines the cutting control mode to be executed by the cutting control section 73 to the mode selected by the selection command input operation applied to the mode selection switch 85 out of the first and second control modes. The cutting control section 73 executes the determined cutting control mode. The mode selection switch 85, alternatively, may be included in the input device 84.

Figure 14:
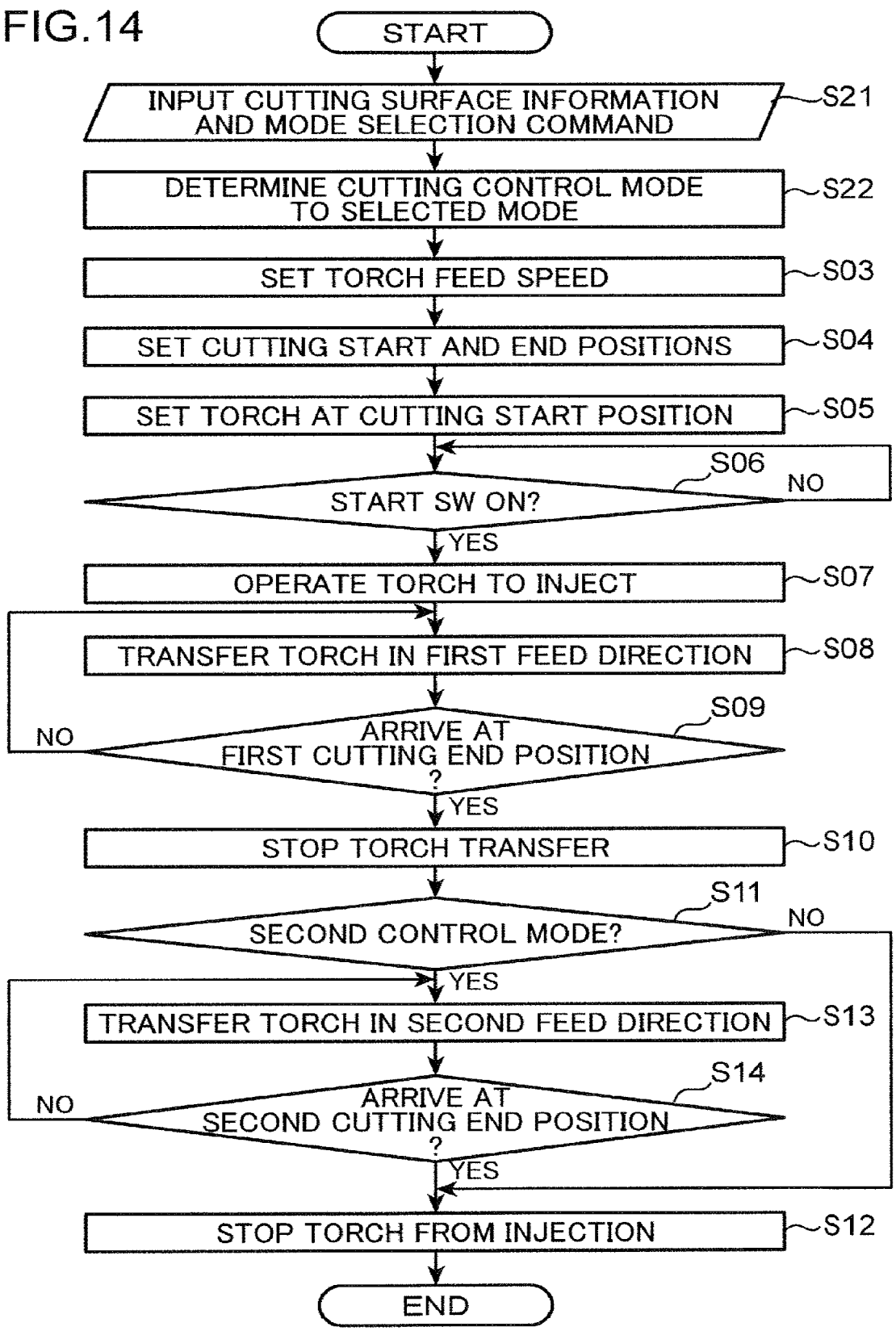
FIG. 14 is a flowchart showing an arithmetic control operation for the cutting control of the controller according to the second embodiment.

FIG. 14 is a flowchart showing an arithmetic control operation for the cutting control of the controller 70 according to the second embodiment. This flowchart differs from the flowchart according to the first embodiment only in the inclusion of steps S21 and S22 in place of steps S01 and S02 of the flowchart according to the first embodiment shown in FIG. 11. Specifically, in step S21, a mode selection command is input to the controller 70 through the mode selection switch 85 in addition to the cutting surface information. In step S22, the mode determination section 74 determines the cutting control mode of the cutting control section 73 to the selected mode.

The cutting apparatus according to the second embodiment enables the operator to freely select the cutting control mode by his/her own judgment.

Next will be described a third embodiment of the present invention with reference to FIGS. 15 to 17.

Figure 15:
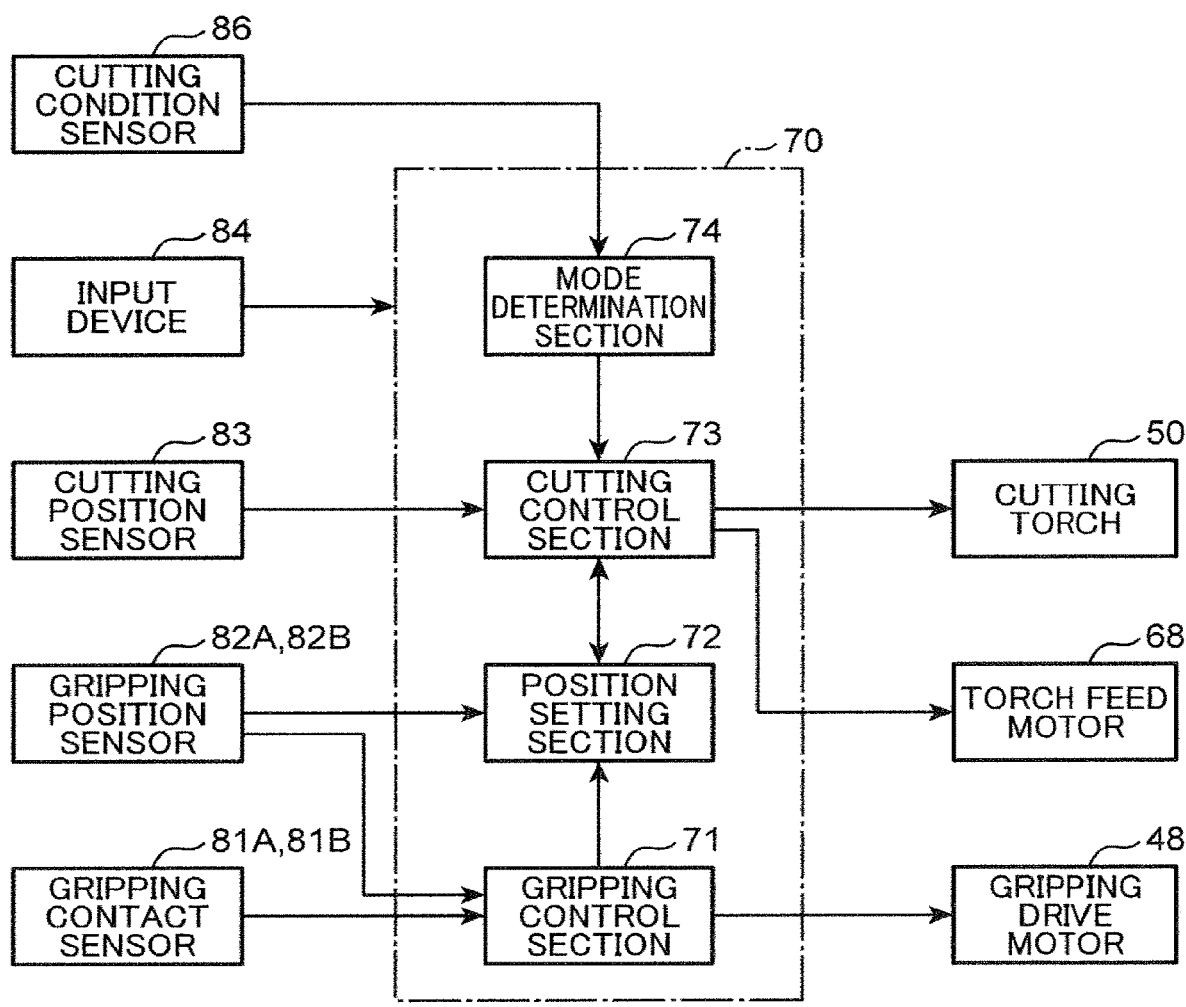
FIG. 15 is a block diagram showing the functional configuration of a controller of a cutting apparatus according to a third embodiment of the present invention.
Figure 16:
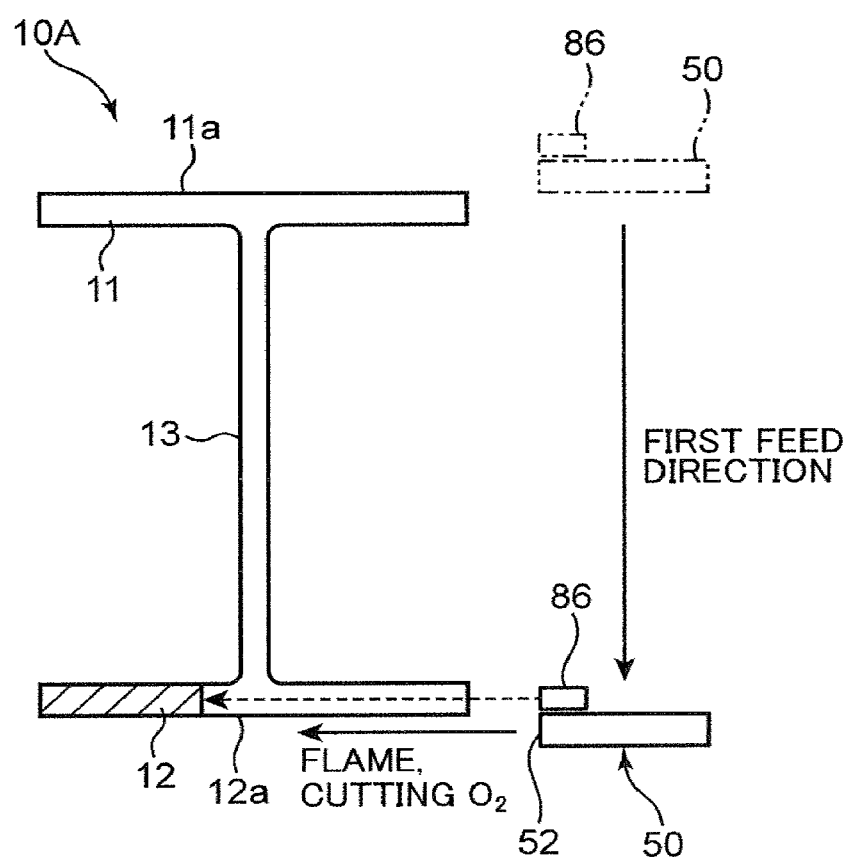
FIG. 16 is a cross-sectional view showing detection of a cutting condition in the cutting apparatus according to the third embodiment.

FIG. 15 shows a functional configuration and input/output signals of the controller 70 according to the third embodiment. Although the controller 70 includes a gripping control section 71, a position setting section 72, a cutting control section 73, and a mode determination section 74, similarly to the controller 70 according to the first embodiment, the cutting apparatus according to the third embodiment includes a cutting condition sensor 86 in addition to a plurality of sensors included in the cutting apparatus according to the first and second embodiments, the cutting condition sensor 86 being connected to the controller 70.

The cutting condition sensor 86 is a cutting condition detector, configured to detect the cutting condition of the cutting surface produced by the movement of the cutting torch 50 from the cutting start position to the first cutting end position. The cutting condition sensor 86 is formed of, for example, an optical or ultrasonic reflection type sensor, provided at a position immediately above the cutting torch 50 so as to be moved integrally with the cutting torch 50 as shown in FIG. 16 (upstream position in the first feed direction position) to detect the distance from the cutting condition sensor 86 to the surface of the steel frame. Therefore, when an uncut part remains, as shown in FIG. 16, in the steel frame at the position corresponding to the cutting condition sensor 86, the distance detected by the cutting condition sensor 86 is equal to the distance from the cutting condition sensor 86 to the uncut part. Conversely, if the steel frame has been cut well with no uncut part, the distance detected by the cutting condition sensor 86 is infinite or a large distance beyond the steel frame to another object located behind the steel frame.

The cutting condition sensor 86 generates an electrical signal corresponding to the distance, and inputs it to the controller 70 as a cutting condition detection signal.

In the case of the cutting apparatus body 20 shown in FIGS. 2 to 4, the cutting condition sensor 86 is preferably fixed, for example, to the torch fixing plate 63 together with the cutting torch 50. The cutting condition detector may alternatively be a cutting condition camera that captures an image of the cut portion.

The mode determination section 74 of the controller 70 automatically determines the cutting control mode based on the cutting condition detection signal input from the cutting condition sensor 86. Specifically, if the cutting condition detection signal is one which allows it to be judged that the part of the steel frame to be cut during the movement of the cutting torch 50 in the first feed direction is actually cut, the mode determination section 74 determines the first control mode as the cutting control mode. Conversely, if the cutting condition detection signal is one which allows it to be judged that the part of the steel frame to be cut remains uncut, the mode determination section 74 determines the second control mode as the cutting control mode.

Figure 17:
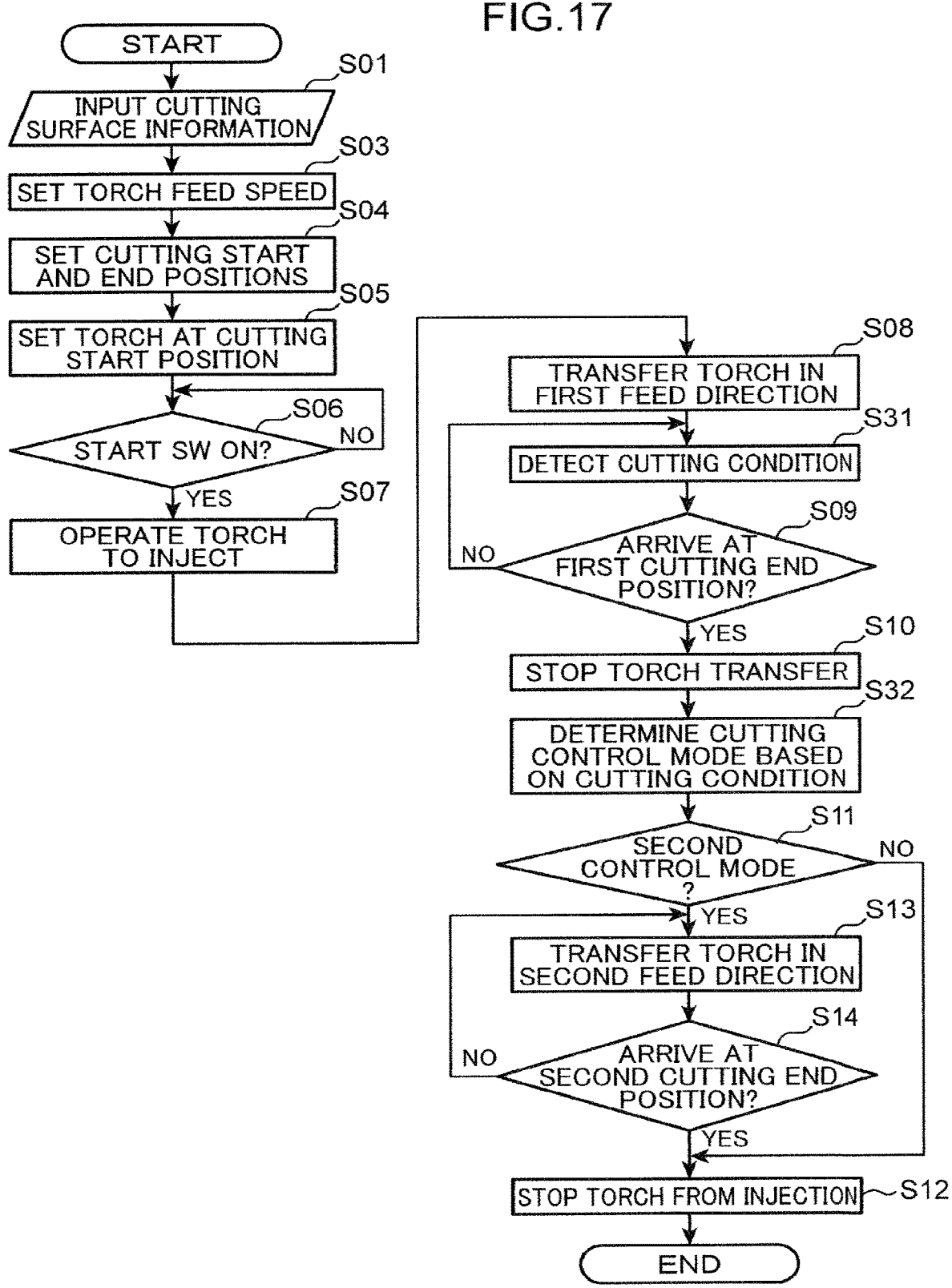
FIG. 17 is a flowchart showing an arithmetic control operation for the cutting control of the controller according to the third embodiment.

FIG. 17 is a flowchart showing an arithmetic control operation for the cutting control of the controller 70 according to the third embodiment. This flowchart differs from the flowchart according to the first embodiment only in the inclusion of step S31 to be executed simultaneously with step S08 and step S32 to be executed after step S10, in place of step S02 of the flowchart according to the first embodiment shown in FIG. 11. In step S31, the cutting condition sensor 86 detects the cutting condition of the steel frame by the cutting torch 50 while the cutting torch 50 is moved in the first feed direction (step S08). At the time when the cutting torch 50 arrives at the first cutting end position (YES in step S09) and the movement of the cutting torch 50 is stopped (step S10), the mode determination section 74 determines the cutting control mode based on the cutting condition of the steel frame detected so far (step S32). This makes it possible to automatically determine a preferable cutting control mode based on the actual cutting condition without requiring a special input operation by an operator.

Furthermore, the position setting section 72 of the controller 70 according to the third embodiment is also capable of automatically setting the second cutting end position based on the detected cutting condition when the cutting control mode is determined to the second control mode. For example, the position setting section 72 can set the second cutting end position as close as possible to the first cutting end position within a range satisfying the condition that the uncut part having failed to be cut by the movement of the cutting torch 50 in the first feed direction can be reliably cut by the movement of the cutting torch 50 in the second feed direction, which setting allows the efficiency of the cutting operation to be improved.

Next will be described a fourth embodiment of the present invention with reference to FIGS. 18 and 19.

Figure 18:
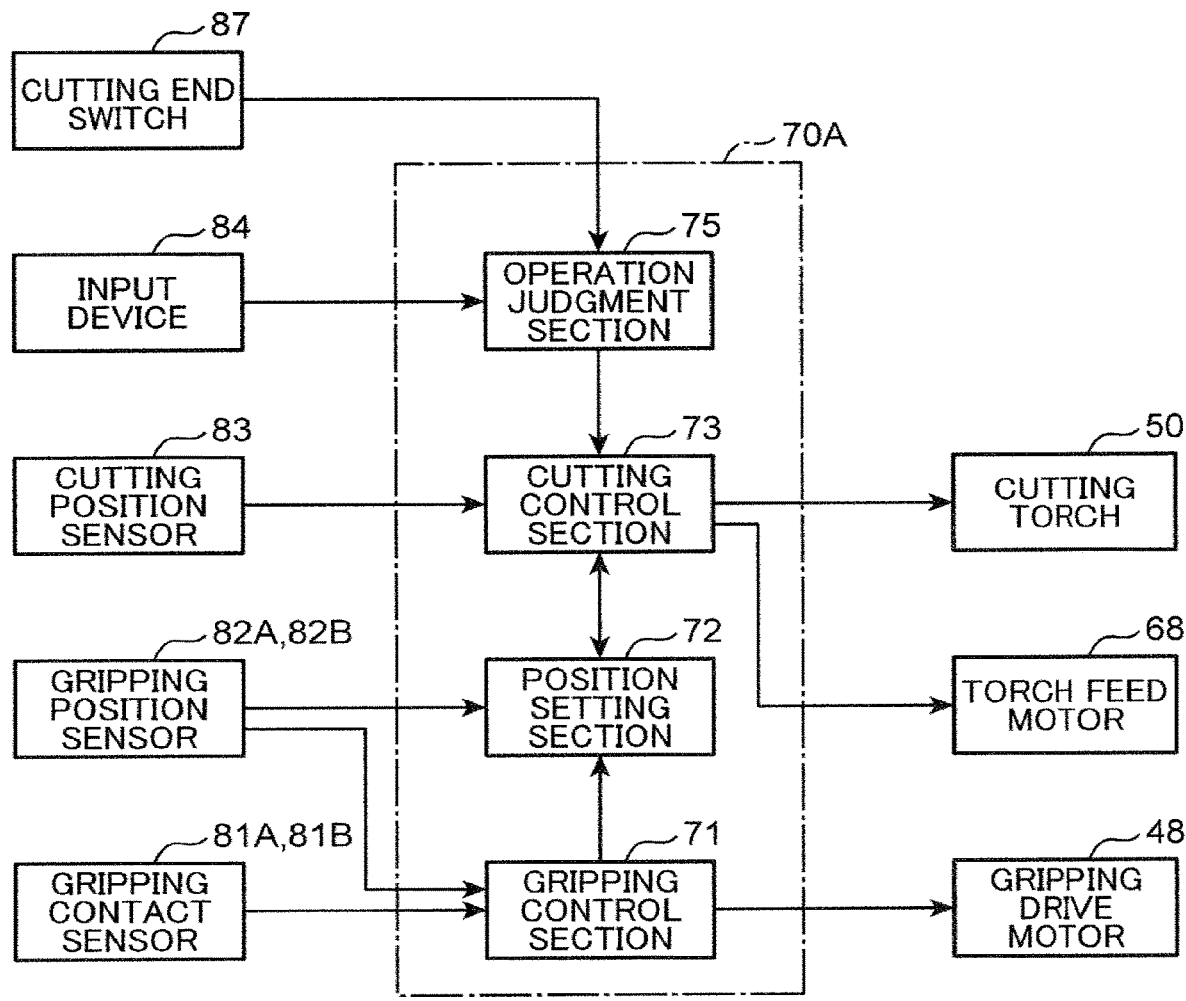
FIG. 18 is a block diagram showing the functional configuration of a controller of a cutting apparatus according to a fourth embodiment of the present invention.

FIG. 18 shows a functional configuration and input/output signals of the controller 70A according to the fourth embodiment. Similarly to the controller 70 according to the second embodiment, the controller 70A includes a gripping control section 71, a position setting section 72, and a cutting control section 73, but includes an operation judgment section 75 instead of the mode determination section 74. Besides, the cutting apparatus according to the fourth embodiment includes a cutting end switch 87 provided in cab 2b in place of the mode selection switch 85 included in the cutting apparatus according to the second embodiment, the cutting end switch 87 being connected to the controller 70A.

The cutting end switch 87 functions as an end command operation unit to which a cutting end command operation is applied. The cutting end command operation is an operation applied to the cutting end switch 87 by an operator to end the cutting operation at the stage when the cutting operation by the movement of the cutting torch 50 in the first feed direction is finished; the operation judgment section 75 of the controller 70A judges whether or not the cutting end command operation is applied to the cutting end switch 87 within a judgment period that is set after the arrival of the cutting torch 50 at the first cutting end position. When the operation judgment section 75 judges that the cutting end command operation is applied within the judgment period, the cutting control section 73 makes the cutting operation ended at this time. On the other hand, when the operation judgment section 75 judges that the cutting end command operation has not been applied to the cutting end switch 87 within the judgment period, the cutting control section 73 operates the torch feed unit so as to automatically start the movement of the cutting torch from the first cutting end position in the second feed direction.

Figure 19:
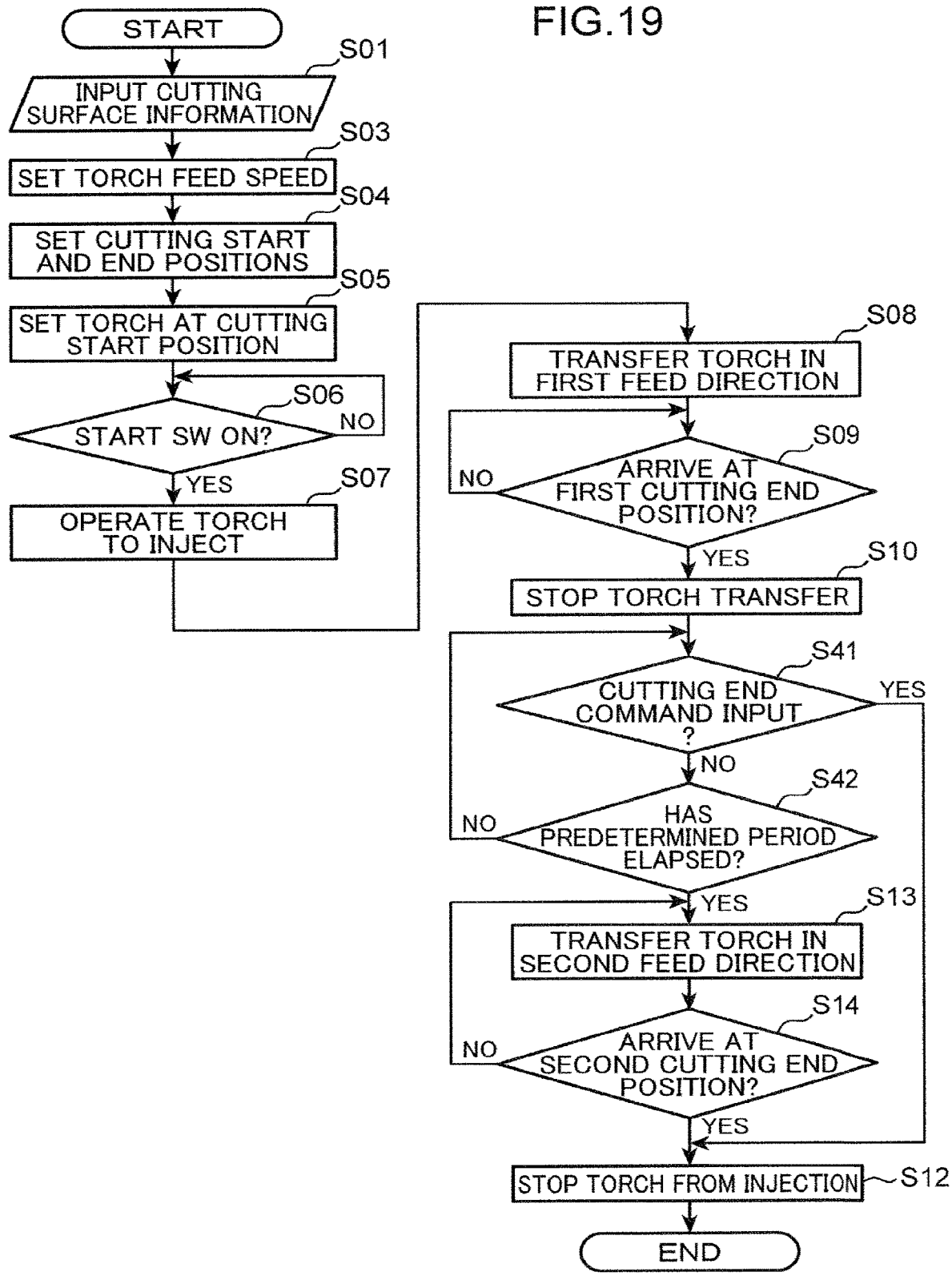
FIG. 19 is a flowchart showing an arithmetic control operation for the cutting control of the controller according to the fourth embodiment.

FIG. 19 is a flowchart showing an arithmetic control operation for the cutting control of the controller 70A according to the fourth embodiment. This flowchart differs from the flowchart according to the first embodiment in the inclusion of steps S41 and S42 to be executed after step S09 in place of step S02 in the flowchart according to the first embodiment shown in FIG. 11. After the cutting torch 50 arrives at the first cutting end position and the transfer thereof is stopped (YES in step S08, and step S09), the operation judgment section 75 judges whether or not a cutting end command operation has been applied to the cutting end switch 87 before a predetermined judgment period elapses (steps S41 and S42). When the operation judgment section 75 judges that the cutting end command operation is applied within the judgment period (YES in step S41), the cutting control section 73 stops the injection from the cutting torch 50 as it is to end the cutting operation (step S12). In short, the cutting control section 73 executes the control operation of the first control mode. In contrast, when the operation judgment section 75 judges that the cutting end command operation has not been applied to the cutting end switch 87 within the judgment period (YES in step S42), the cutting control section 73 makes the cutting torch 50 be transferred from the first cutting end position in the second feed direction (step S13) at the time when the judgment period has elapsed, and stops the injection from the cutting torch 50 (step S12) at the time when the cutting torch 50 arrives at the second cutting end position (YES in step S14). In short, the cutting control section 73 executes the control operation of the second control mode.

This cutting apparatus can automatically judge whether or not the operator has intention to end the cutting by the movement in the second feed direction based on the cutting condition of the steel frame at the time when the cutting torch arrives at the first cutting finish position, that is, which mode the operator intends to select between the first and second control modes.

Next will be described a fifth embodiment of the present invention with reference to FIGS. 20 and 21.

Figure 20:
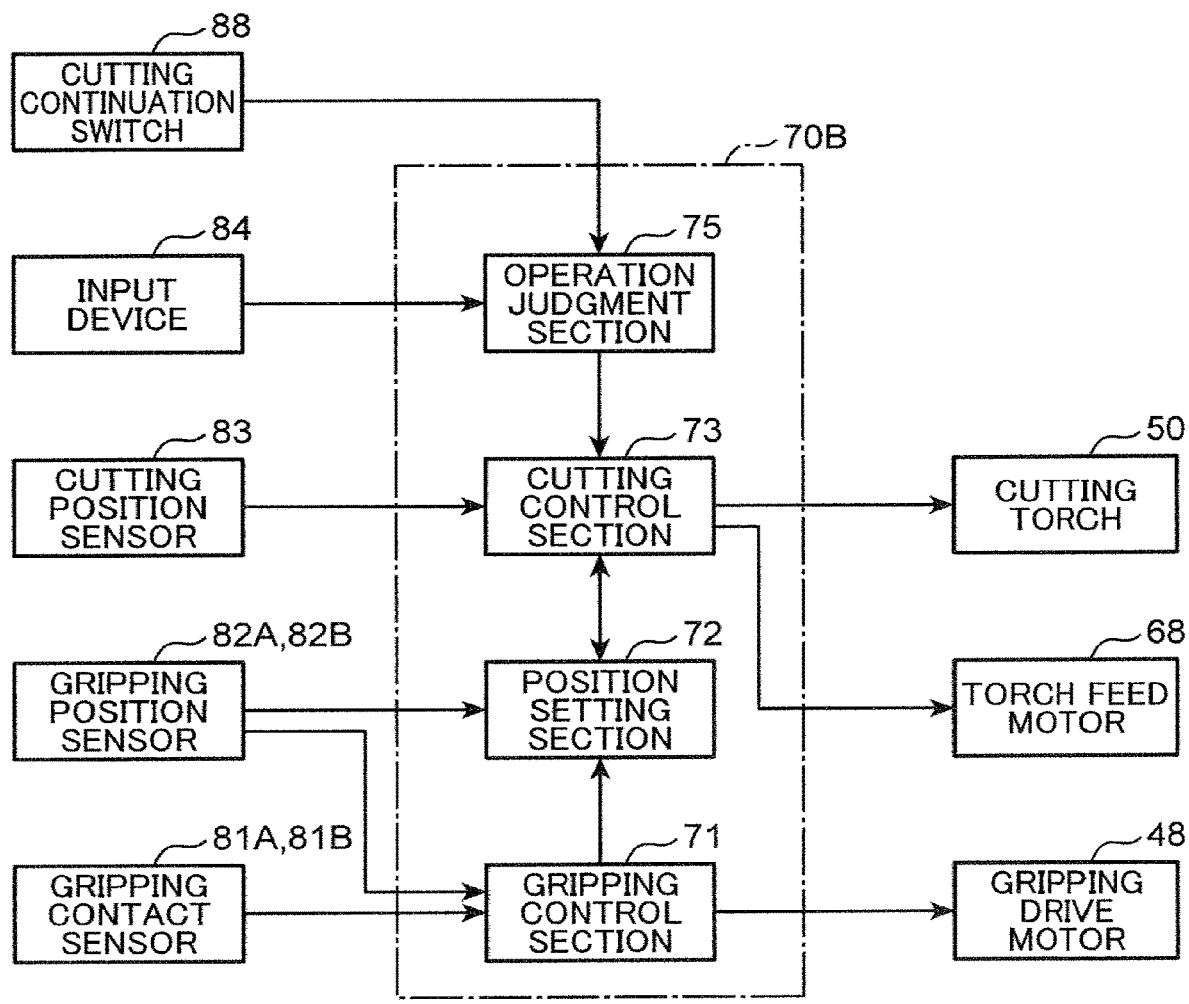
FIG. 20 is a block diagram showing the functional configuration of a controller of a cutting apparatus according to a fifth embodiment of the present invention.

FIG. 20 shows a functional configuration and input/output signals of the controller 70A according to the fifth embodiment. Although the controller 70B includes a gripping control section 71, a position setting section 72, a cutting control section 73, and an operation judgment section 75, similarly to the controller 70A according to the fourth embodiment, the cutting apparatus according to the fifth embodiment includes a cutting continuation switch 88 provided in the cab 2b in place of the cutting end switch 87 included in the cutting apparatus according to the fourth embodiment, the cutting continuation switch 88 being connected to the controller 70B.

The cutting continuation switch 88 functions as a continuation command operation unit to which a cutting continuation command operation is applied by the operator. The cutting continuation command operation is an operation applied to the cutting continuation switch 88 by the operator to continue the cutting operation even after the cutting operation by the movement of the cutting torch 50 in the first feed direction is completed. The operation judgment section 75 of the controller 70B judges whether or not the cutting continuation command operation is applied to the cutting continuation switch 88 within a judgment period after the arrival of the cutting torch 50 at the first cutting end position. When the operation judgment section 75 judges that the cutting continuation command operation has not been applied within the judgment period, the cutting control section 73 automatically makes the cutting operation ended at this time. On the other hand, when the operation judgment section 75 judges that the cutting continuation command operation is applied to the cutting continuation switch 88 within the judgment period, the cutting control section 73 operates the torch feed unit so as to start the movement of the cutting torch from the first cutting end position to the second feed direction.

Figure 21:
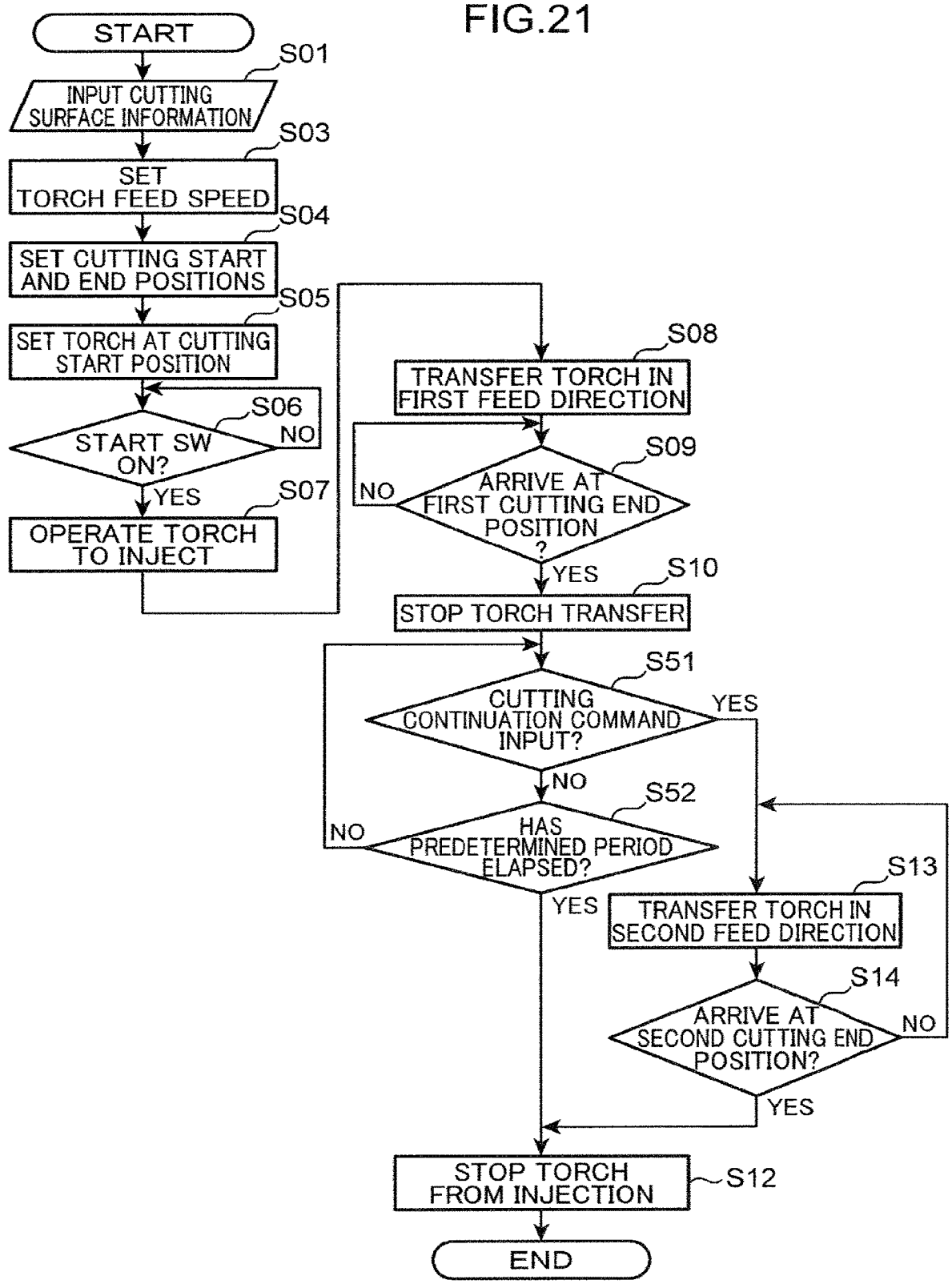
FIG. 21 is a flowchart showing an arithmetic control operation for the cutting control of the controller according to the fifth embodiment.

FIG. 21 is a flowchart showing an arithmetic control operation for the cutting control of the controller 70 according to the fifth embodiment. This flowchart differs from the flowchart according to the fourth embodiment in the inclusion of steps S51 and S52 in place of steps S41 and S42 of the flowchart according to the fourth embodiment shown in FIG. 19. After the cutting torch 50 arrives at the first cutting end position and the transfer thereof is stopped (YES in step S09, and step S10), the operation judgment section 75 judges whether or not a cutting continuation command operation has been applied to the cutting continuation switch 88 before a predetermined judgment period elapses (steps S51 and S52). When the cutting continuation command operation is judged not to be applied within the judgment period (YES in step S52), the cutting control section 73 stops the injection from the cutting torch 50 as it is to end the cutting operation (step S12). In short, the first control mode is executed. In contrast, when the cutting continuation command operation is judged to be applied within the judgment period (YES in step S51), the cutting control section 73 makes the cutting torch 50 be transferred from the first cutting end position in the second feed direction (step S13), and stops the injection from the cutting torch 50 (step S12) at the time when the cutting torch 50 arrives at the second cutting end position (YES in step S14). In short, the cutting control section 73 executes the control operation of the second control mode.

The cutting apparatus can automatically judge whether or not the operator has intention to continue cutting by the movement in the second feed direction based on the cutting condition of the steel frame at the time when the cutting torch arrives at the first cutting end position, that is, which mode the operator intends to select between the first and second control modes.

The present invention does not absolutely require the setting of the second cutting end position by the position setting section. For example, the second cutting end position may be constantly set to the cutting start position or in the vicinity thereof regardless of the cutting surface shape or the cutting condition, with emphasis on reliable cutting. Alternatively, the movement of the cutting torch in the second feed direction may be stopped when a stop command is input by an operator during the movement.

The cutting control section is not necessarily limited to one having both the first and second control modes. For example, the cutting control section may always execute an operation corresponding to the control operation of the second control mode. The cutting start position and the first cutting end position are not necessarily set based on the first and second gripping positions. If the upper limit of the size of the steel frame to be cut is determined, the cutting start position and the cutting end position are allowed to be fixed based on the upper limit size. Alternatively, the first and second feed directions may be directions intersecting the gripping direction by the gripping device.

Besides, the cutting method and apparatus according to the present invention are not limited to ones to completely cut the cutting surface of the steel frame by the movement of the cutting torch in the second feed direction. For example, it is also possible to intentionally leave a part of the cutting surface even after the movement of the cutting torch in the second feed direction and to perform threading the left part or the like.

As described above, a method and apparatus capable of efficiently cutting a steel frame in a short time are provided.

Provided is a method for cutting a steel frame along a cutting surface perpendicular to a longitudinal direction of the steel frame, the method comprising: holding the steel frame by a holding device; setting a cutting start position to a position at a first end of the cutting surface or to a position on an outer side of the first end; setting a first cutting end position to a position of a second end of the cutting surface opposite to the cutting start position across the cutting surface or to a position on an outer side of the second end; locating a cutting torch at a position apart from the steel frame held by the holding device in a direction along the cutting surface and moving the cutting torch from the cutting start position to the first cutting end position in a first feed direction perpendicular to a supply direction along the cutting surface with applying a flame in the supply direction from a fire port of the cutting torch and supplying oxygen for oxidation of the steel frame to thereby cut a part of the cutting surface; and stopping the cutting torch at the first cutting end position and thereafter moving the cutting torch in a second feed direction opposite to the first feed direction from the first cutting end position to thereby cut at least a part of a remaining part of the steel frame, the remaining part being a part having failed to be cut by the movement in the first feed direction.

Regarding holding the steel frame, for example, it is preferable that the holding device includes a first gripping member and a second gripping member, and holding the steel frame includes gripping the steel frame between the first gripping member and the second gripping member in a gripping direction parallel to the first feed direction and the second feed direction. This allows the cutting start position and the first cutting end position to be set based on respective positions of the first gripping member and the second gripping member that are gripping the steel frame.

The second cutting end position, at which the cutting by the movement of the cutting torch in the second feed direction is ended, can be appropriately set. The second cutting end position may be determined based on, for example, either at least one of the size and the shape of the cutting surface or an uncut part that is left on the cutting surface after cutting by the movement of the cutting torch in the first feed direction.

Also provided is a cutting apparatus for cutting a steel frame along a cutting surface perpendicular to a longitudinal direction of the steel frame, the cutting apparatus comprising: a first gripping member and a second gripping member that grip the steel frame in a gripping direction along the cutting surface; a gripping drive unit that moves the first gripping member and the second gripping member in the gripping direction to make the first gripping member and the second gripping member grip and release the steel frame; a cutting torch having a fire port and being capable of supplying a flame and oxygen for oxidation of the steel frame to the steel frame from the fire port; a torch feed unit capable of holding the cutting torch at a position apart from the steel frame in a direction along the cutting surface and in a specific posture where the fire port of the cutting torch is directed to the steel frame and moving the cutting torch in a first feed direction which is a direction along the cutting surface and perpendicular to a supply direction in which the flame and the oxygen are supplied from the fire port and in a second feed direction opposite to the first feed direction while maintaining the specific posture; a gripping position detector that detects respective positions of the first gripping member and the second gripping member; a position setting section that sets a cutting start position to a position of a first end of the cutting surface or to a position on an outer side of the first end with respect to the gripping direction based on the position of the first gripping member and sets a first cutting end position to a position of a second end of the cutting surface opposite to the cutting start position across the cutting surface or to a position on an outer side of the second end with respect to the gripping direction based on the position of the second gripping member; and a cutting control section that controls respective operations of the cutting torch and the torch feed unit so as to move the cutting torch in the first feed direction from the cutting start position to the first cutting end position, while making a flame be applied from the fire port of the cutting torch in the supply direction along the cutting surface and making oxygen for oxidation of the steel frame be supplied, and so as to stop the cutting torch at the first cutting end position and thereafter move the cutting torch from the first cutting end position in the second feed direction opposite to the first feed direction.

In this apparatus, it is preferable that the cutting control section has a first control mode and a second control mode as cutting control modes, the cutting apparatus further comprising a mode switching unit for switching the cutting control mode of the cutting control section. The cutting control section, in the first control mode, performs an operation of controlling an operation of the torch feed unit so as to end a movement and an operation of the cutting torch at the time of moving the cutting torch to the first cutting end position from the cutting start position. The cutting control section, in the second control mode, performs an operation of controlling an operation of the torch feed unit so as to move the cutting torch from the cutting start position to the first cutting end position and further move the cutting torch from the first cutting end position in a second feed direction opposite to the first feed direction. Such combination of the cutting control section and the mode switching unit allows the efficiency of the cutting operation to be improved. For example, when sufficient cutting of the steel frame is performed only by the movement of the cutting torch from the cutting start position to the first cutting end position, executing the control operation according to the first control mode allows wasteful movement of the cutting torch, that is, a movement of the cutting torch from the first cutting end position to the second feed direction, to be avoided.

The mode switching unit preferably includes, for example, an information input unit to which an input of information on the cutting surface is applied, and a mode determination section that determines the cutting control mode of the cutting control section based on the input of the information on the cutting surface applied to the information input unit. According to the combination of the information input unit and the mode determination section, the control mode suitable for the cutting surface is automatically determined only by input of the information on the cutting surface by a user.

Alternatively, the mode switching unit preferably includes a selection input unit to which an input of a selection command for selecting the cutting control mode is applied, and a mode determination section that determines the cutting control mode of the cutting control section to the cutting control mode selected by the selection command. The combination of the selection input and the mode determination section allows a user to freely select the cutting control mode.

The mode switching unit, alternatively, may include a cutting condition detector that detects a cutting condition of the cutting surface produced by the movement of the cutting torch from the cutting start position to the first cutting end position, and a mode determination section that determines the cutting control mode of the cutting control section based on the cutting condition detected by the cutting condition detector. The combination of the cutting condition detector and the mode determination section can automatically determine a preferable cutting control mode based on the cutting condition.

Alternatively, it is also possible that the mode switching section includes an end command operation section to which a cutting end command operation for making the cutting operation ended at a stage when the cutting torch arrives at the first cutting end position, and an operation judgment section that judges whether or not the cutting end command operation has been applied to the end command operation section within a judgment period after the arrival of the cutting torch at the first cutting end position, and that the cutting control section is configured to operate the torch feed unit to make the cutting operation be ended when the operation judgment section judges that the cutting end command operation has been applied to the end command operation section within the judgment period and configured to operate the torch feed unit to make the movement of the cutting torch from the first cutting end position in the second feed direction be started when the operation judgment section judges that the cutting end command operation has not been applied to the end command operation section within the judgment period. Such combination of the end command operation unit, the operation judgment section, and the cutting control section makes it possible to automatically judge whether or not the operator has intention to end the cutting by the movement in the second feed direction based on the cutting condition of the steel frame at the time when the cutting torch arrives at the first cutting end position, that is, which mode the operator intends to select between the first and second control modes.

Alternatively, it is also possible that the mode switching unit includes a continuation command operation unit to which a cutting continuation command operation for continuing the cutting operation even after the cutting torch arrives at the first cutting end position is applied, and an operation judgment section that judges whether or not the cutting continuation command operation has been applied to the continuation command operation unit within a judgment period after the arrival of the cutting torch at the first cutting end position, and that the cutting control section is configured to operate the torch feed unit to make the cutting operation ended at the first cutting end position when the operation judgment section judges that the cutting continuation command operation has not been applied within the judgment period and configured to operate the torch feed unit to start moving the cutting torch from the first cutting end position to the second feed direction when the operation judgment section judges that the cutting continuation command operation has been applied within the judgment period. Such combination of the continuation command operation unit, the operation judgment section, and the cutting control section makes it possible to automatically judge whether or not the operator has intention to start cutting by the movement in the second feed direction based on the cutting condition of the steel frame at the time when the cutting torch arrives at the first cutting end position, that is, which mode the operator intends to select between the first and second control modes.

The second cutting end position for ending the cutting by the movement of the cutting torch in the second feed direction can be freely set. The second cutting end position may be either a position equivalent to the cutting start position (that is, the cutting torch may be completely reciprocated) or a position between the cutting start position and the first cutting end position. In either case, it is more preferable that the position setting section is configured to determine the second cutting end position in addition to the cutting start position and the first cutting end position.

For example, in the embodiment where the mode switching unit includes the information input unit, the position setting section can determine the second cutting end position based on the information on the cutting surface input by the information input unit.

Besides, in the embodiment where the mode switching unit includes the cutting condition detector, the position setting section can determine the second cutting end position based on the cutting condition detected by the cutting condition detector.

The invention claimed is:

1. A cutting apparatus for cutting a steel frame along a cutting surface perpendicular to a longitudinal direction of the steel frame, the cutting apparatus comprising:
   a first gripping member and a second gripping member that grip the steel frame in a gripping direction along the cutting surface;
   a gripping drive unit that moves the first gripping member and the second gripping member in the gripping direction to make the first gripping member and the second gripping member grip and release the steel frame;
   a cutting torch having a fire port and being capable of supplying a flame and oxygen for oxidation of the steel frame to the steel frame from the fire port;
   a torch feed unit capable of holding the cutting torch at a position apart from the steel frame in a direction along the cutting surface and in a specific posture where the fire port of the cutting torch is directed to the steel frame and moving the cutting torch in a first feed direction which is a direction along the cutting surface and perpendicular to a supply direction in which the flame and the oxygen are supplied from the fire port and in a second feed direction opposite to the first feed direction while maintaining the specific posture;
   a gripping position detector that detects respective positions of the first gripping member and the second gripping member;
   a position setting section that sets a cutting start position to a position of a first end of the cutting surface or to a position on an outer side of the first end with respect to the gripping direction based on the position of the first gripping member and sets a first cutting end position to a position of a second end of the cutting surface opposite to the cutting start position across the cutting surface or to a position on an outer side of the second end with respect to the gripping direction based on the position of the second gripping member; and
   a cutting control section that controls respective operations of the cutting torch and the torch feed unit so as to move the cutting torch in the first feed direction from the cutting start position to the first cutting end position, while making a flame be applied from the fire port of the cutting torch in the supply direction along the cutting surface and making oxygen for oxidation of the steel frame be supplied, and so as to stop the cutting torch at the first cutting end position and thereafter move the cutting torch from the first cutting end position in the second feed direction opposite to the first feed direction.

2. The cutting apparatus according to claim 1, wherein the cutting control section has a first control mode and a second control mode as cutting control modes, configured to perform, in the first control mode, an operation of controlling an operation of the torch feed unit so as to end a movement of the cutting torch and an operation of the cutting torch at a time when moving the cutting torch from the cutting start position to the first cutting end position, and configured to perform, in the second control mode, an operation of controlling the operation of the torch feed unit so as to move the cutting torch from the cutting start position to the first cutting end position and further move the cutting torch from the first cutting end position in the second feed direction opposite to the first feed direction, the cutting apparatus further comprising a mode switching unit that switches the cutting control mode of the cutting control section.

3. The cutting apparatus according to claim 2, wherein the mode switching unit has an information input unit to which an input of information on the cutting surface is applied, and a mode determination section that determines the cutting control mode of the cutting control section based on the input of information on the cutting surface applied to the information input unit.

4. The cutting apparatus according to claim 2, wherein the mode switching unit has a selection input unit to which an input of a selection command for selection of the cutting control mode is applied, and a mode determination section that determines the cutting control mode of the cutting control section to a cutting control mode selected by the selection command.

5. The cutting apparatus according to claim 2, wherein the mode switching unit includes: a cutting condition detector for detecting a cutting condition of the cutting surface produced by the movement of the cutting torch from the cutting start position to the first cutting end position; and a mode determination section that determines the cutting control mode of the cutting control section based on the cutting condition detected by the cutting condition detector.

6. The cutting apparatus according to claim 2, wherein: the mode switching section includes an end command operation section to which a cutting end command operation for making the cutting operation be ended at a stage when the cutting torch arrives at the first cutting end position, and an operation judgment section that judges whether or not the cutting end command operation has been applied to the end command operation section within a judgment period after the arrival of the cutting torch at the first cutting end position; and the cutting control section is configured to operate the torch feed unit to make the cutting operation be ended when the operation judgment section judges that the cutting end command operation has been applied to the end command operation section within the judgment period and configured to operate the torch feed unit to start moving the cutting torch from the first cutting end position in the second feed direction when the operation judgment section judges that the cutting end command operation has not been applied to the end command operation section within the judgment period.

7. The cutting apparatus according to claim 2, wherein: the mode switching unit includes a continuation command operation unit to which a cutting continuation command operation for continuing the cutting operation even after the cutting torch arrives at the first cutting end position is applied, and an operation judgment section that judges whether or not the cutting continuation command operation has been applied to the continuation command operation unit within a judgment period after the arrival of the cutting torch at the first cutting end position; and the cutting control section is configured to operate the torch feed unit to make the cutting operation be ended at the first cutting end position when the operation judgment section judges that the cutting continuation command operation has not been applied within the judgment period and configured to operate the torch feed unit to make the movement of the cutting torch from the first cutting end position to the second feed direction be started when the operation judgment section judges that the cutting continuation command operation has been applied within the judgment period.

8. The cutting apparatus according to claim 1, wherein the position setting section sets a second cutting end position for ending the cutting by the movement of the cutting torch in the second feed direction, in addition to the cutting start position and the first cutting end position.

9. The cutting apparatus according to claim 3, wherein the position setting section sets a second cutting end position for ending the cutting by the movement of the cutting torch in the second feed direction, in addition to the cutting start position and the first cutting end position, and determines the second cutting end position based on the input of the information on the cutting surface applied to the information input unit.

10. The cutting apparatus according to claim 5, wherein the position setting section sets a second cutting end position for ending the cutting by the movement of the cutting torch in the second feed direction, in addition to the cutting start position and the first cutting end position, and determines the second cutting end position based on the cutting condition detected by the cutting condition detector.

\* \* \* \* \*